US006839474B2

(12) United States Patent
Steinberg et al.

(10) Patent No.: US 6,839,474 B2
(45) Date of Patent: Jan. 4, 2005

(54) OPTICAL ASSEMBLY FOR COUPLING WITH INTEGRATED OPTICAL DEVICES AND METHOD FOR MAKING

(75) Inventors: Dan A. Steinberg, Blacksburg, VA (US); David W. Sherrer, Blacksburg, VA (US); Mindaugas F. Dautartas, Blacksburg, VA (US); Arden Jeantilus, Blacksburg, VA (US)

(73) Assignee: Shipley Company, L.L.C., Marlborough, MA (US)

(*) Notice: Subject to any disclaimer, the term of this patent is extended or adjusted under 35 U.S.C. 154(b) by 106 days.

(21) Appl. No.: 09/987,766

(22) Filed: Nov. 15, 2001

(65) Prior Publication Data

US 2002/0196998 A1 Dec. 26, 2002

Related U.S. Application Data

(60) Provisional application No. 60/249,795, filed on Nov. 16, 2000.

(51) Int. Cl.[7] ............................ G02B 6/12; G02B 6/30; G02B 6/32

(52) U.S. Cl. .............................. 385/14; 385/34; 385/49

(58) Field of Search ............................. 385/14, 15, 33, 385/34, 36, 37, 31, 49–51

(56) References Cited

U.S. PATENT DOCUMENTS

| | | | |
|---|---|---|---|
| 3,894,789 A | 7/1975 | Kobayashi et al. | |
| 4,639,074 A | 1/1987 | Murphy | |
| 4,772,086 A | 9/1988 | Bellerby et al. | |
| 4,796,975 A | 1/1989 | Lukas et al. | |
| 4,836,645 A | 6/1989 | Lefevre et al. | |
| 5,080,458 A | 1/1992 | Hockaday | |
| 5,299,276 A | 3/1994 | Okamura et al. | |
| 5,381,494 A | 1/1995 | O'Donnell et al. | |
| 5,446,815 A | 8/1995 | Ota et al. | |
| 5,481,632 A | 1/1996 | Hirai et al. | |
| 5,513,290 A | 4/1996 | Ishikawa et al. | |
| 5,546,488 A | 8/1996 | Kitamura et al. | |
| 5,548,673 A | 8/1996 | Kitamura et al. | |
| 5,557,695 A | 9/1996 | Yamane et al. | |
| 5,625,730 A | 4/1997 | Ishikawa et al. | |
| 5,684,902 A | 11/1997 | Tada | |
| 5,703,973 A | 12/1997 | Mettler et al. | |
| 5,796,900 A | 8/1998 | Degani et al. | |
| 5,853,626 A * | 12/1998 | Kato | 264/1.25 |
| 5,859,942 A | 1/1999 | Ueda | |
| 5,909,524 A | 6/1999 | Tabuchi | |

(List continued on next page.)

FOREIGN PATENT DOCUMENTS

JP 11305151 A * 11/1999 ........... G02B/26/08

*Primary Examiner*—John D. Lee
(74) *Attorney, Agent, or Firm*—Jonathan D. Baskin

(57) ABSTRACT

An optical assembly which allows for passive alignment of the various elements is described. A substrate with a cut out portion and an upper surface is utilized as a mount for an optical array and an imaging assembly. The optical array, which preferably includes a plurality of optical fibers is positioned on V-grooves located on the upper surface. The imaging assembly, which preferably includes a plurality of lenses, such as GRIN lenses, is lowered at least partially into the cut-out portion. The optical fibers are optically coupled with said lenses. A waveguide, having a plurality of waveguide cores within a cladding, may further be optically coupled with the lenses, or alternatively, directly to the optical fibers. An integrated optic chip may also be affixed to the substrate or mounted on the substrate.

43 Claims, 19 Drawing Sheets

U.S. PATENT DOCUMENTS

| | | | | | |
|---|---|---|---|---|---|
| 5,966,488 | A | * | 10/1999 | Miura et al. | 385/93 |
| 6,215,946 | B1 | | 4/2001 | Sherrer | 385/137 |
| 6,222,967 | B1 | * | 4/2001 | Amano et al. | 385/49 |
| 6,340,251 | B1 | * | 1/2002 | Shibuya et al. | 385/89 |
| 6,363,201 | B2 | | 3/2002 | Sherrer et al. | 385/137 |
| 6,456,766 | B1 | * | 9/2002 | Shaw et al. | 385/47 |
| 6,483,969 | B1 | * | 11/2002 | Yap et al. | 385/52 |
| 6,526,204 | B1 | | 2/2003 | Sherrer et al. | 385/49 |
| 2002/0001435 | A1 | | 1/2002 | Steinberg et al. | 385/49 |
| 2002/0181854 | A1 | * | 12/2002 | Steinberg et al. | 385/20 |

* cited by examiner

FIG. 3
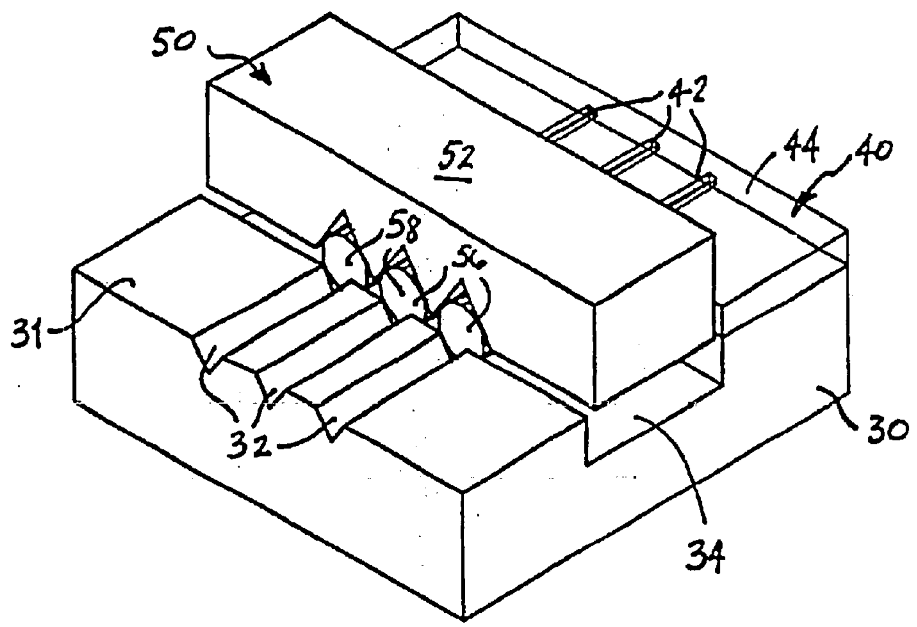
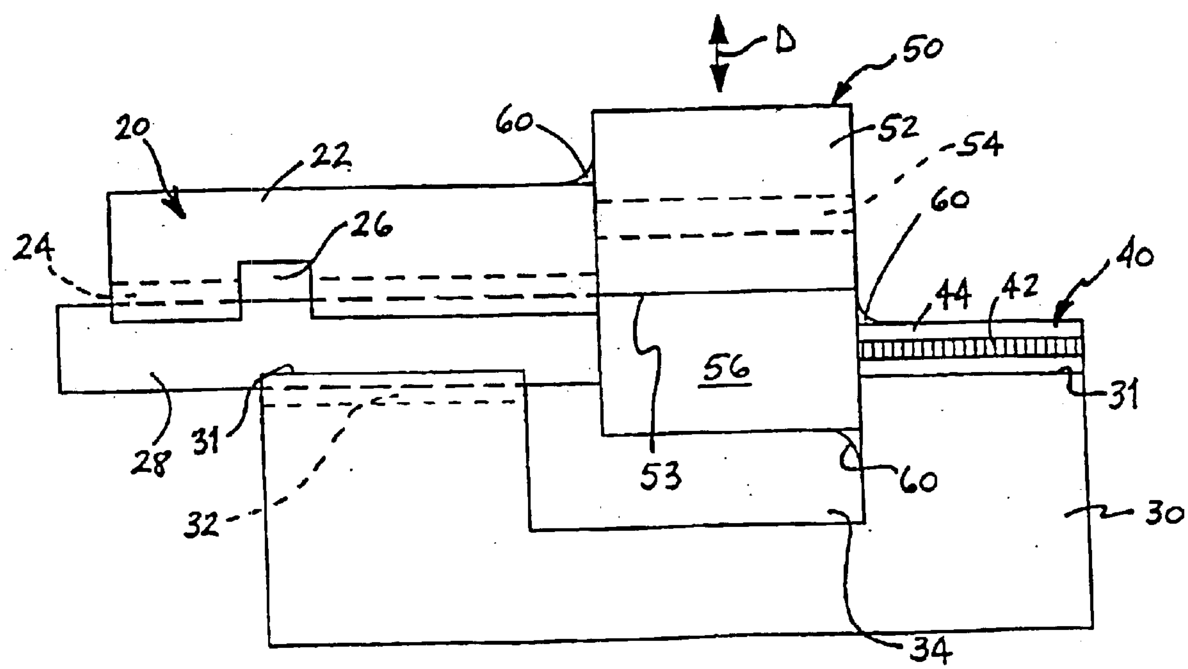
FIG. 4

70
58
54
56
52
53
72
59

200
132
138
136
42
44
134
40
230
134
138

40
136
91
136
90
91
132
333
60
330

44
238
42
40
136
91
136
238
90
132
333
60
33

50
52
54
56
53
400
120
122
24
28
E
40
42
44
236
432
238
90
333
91
430

400
122
52
54
24
42
44
56
28
236
53
432
90
238
430
91
333

52
54
56
53
E
38
44
42
236
432
91
236
90
238
430
60

FIG. 17
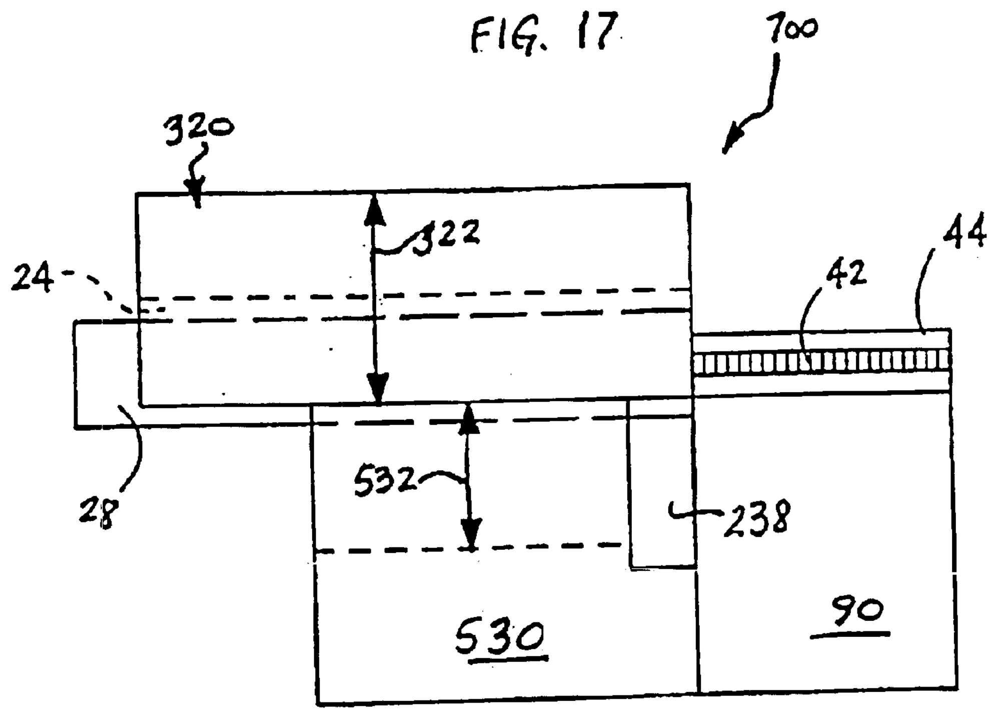
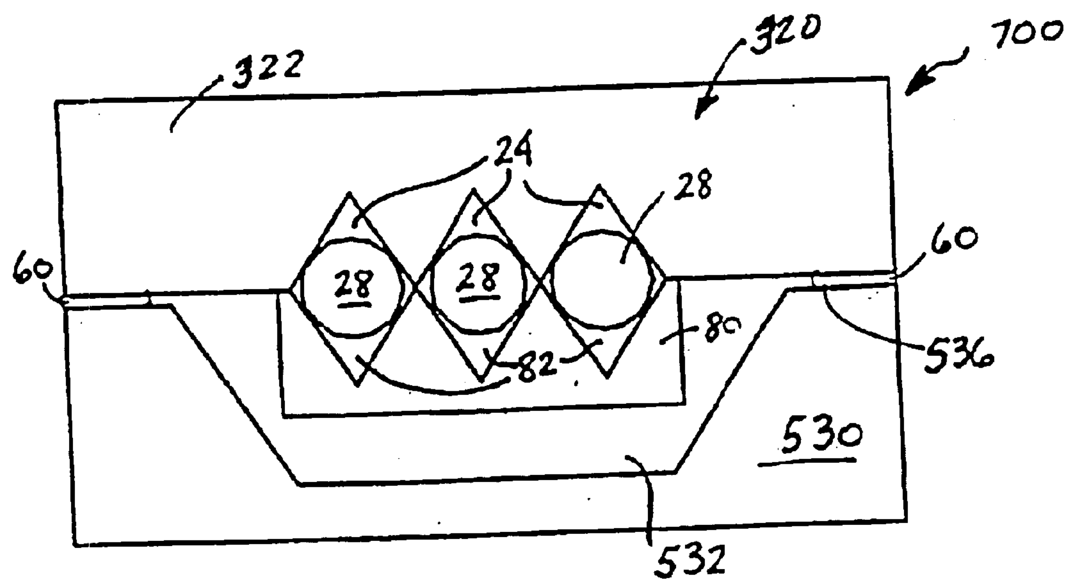
FIG. 18

800
50
52
120
122
24
42
44
56
28
532
238
530
90

900
44
42
338
337
636b
636a
634b
634a
636b
90
636a
338
60
632
337
630

FIG. 23
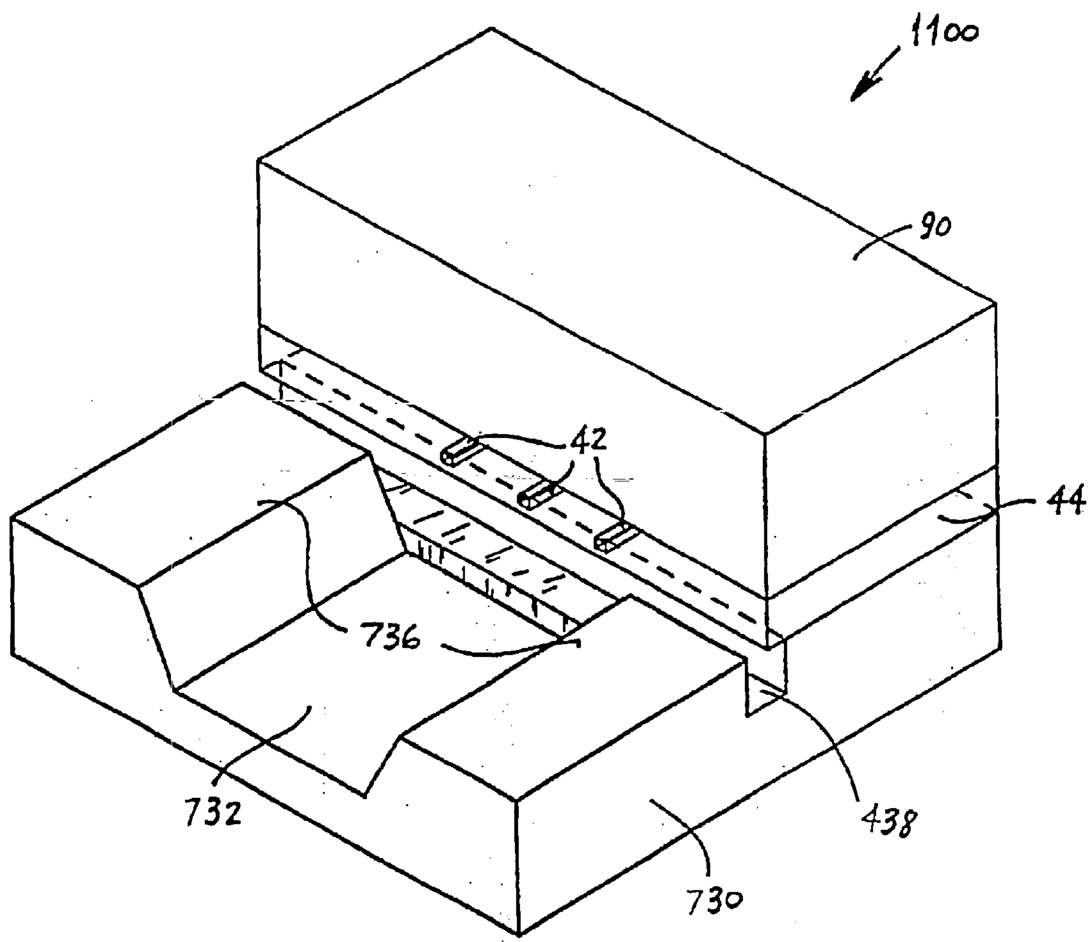
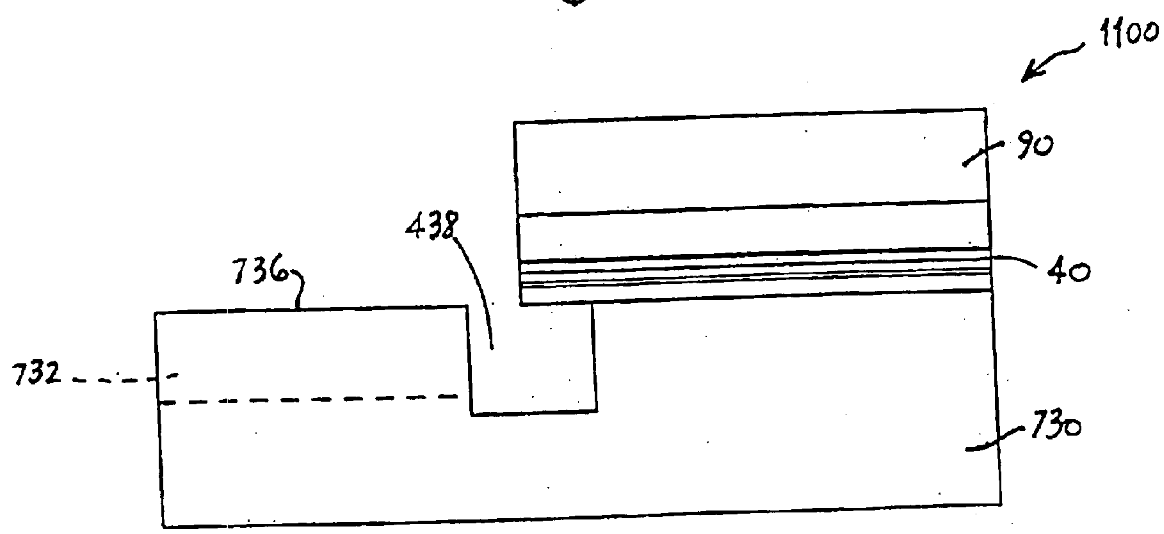
FIG. 24

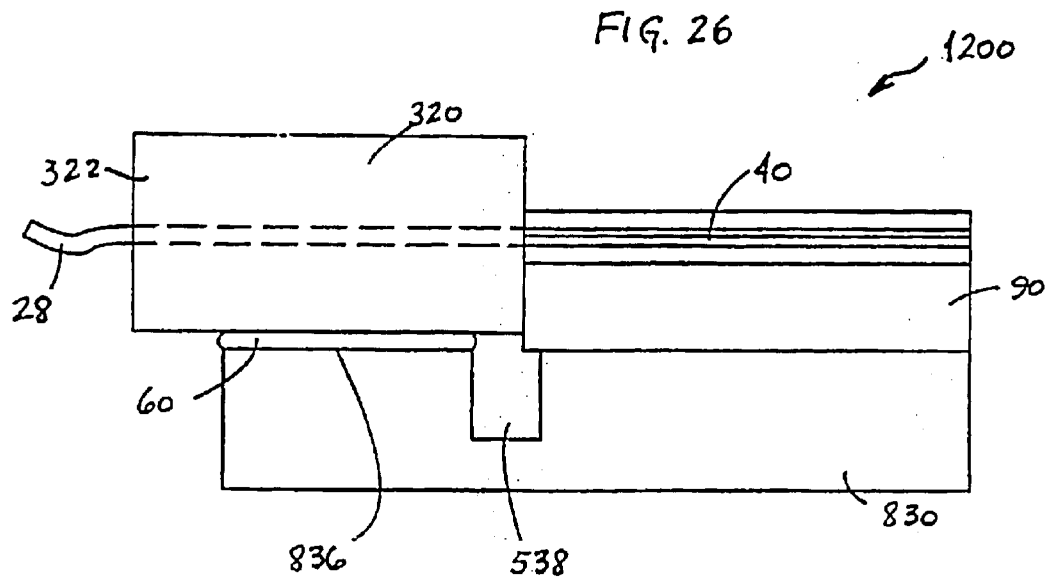
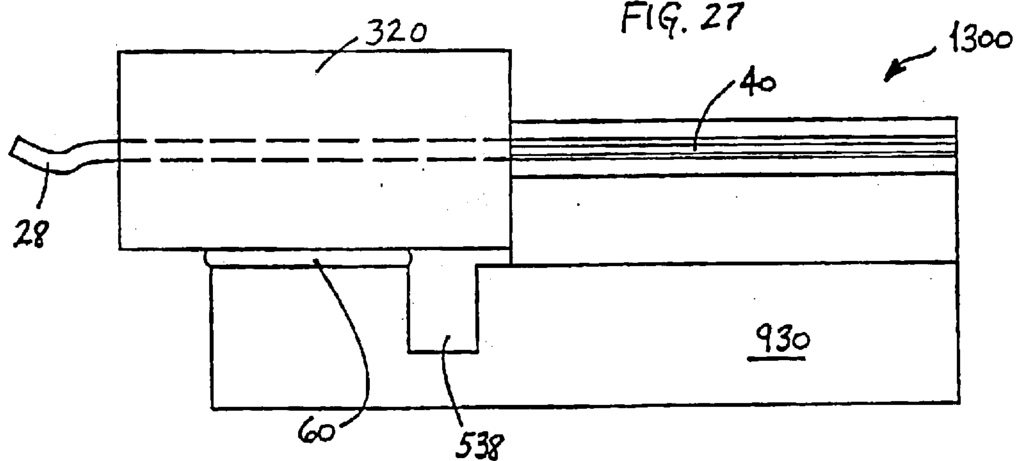
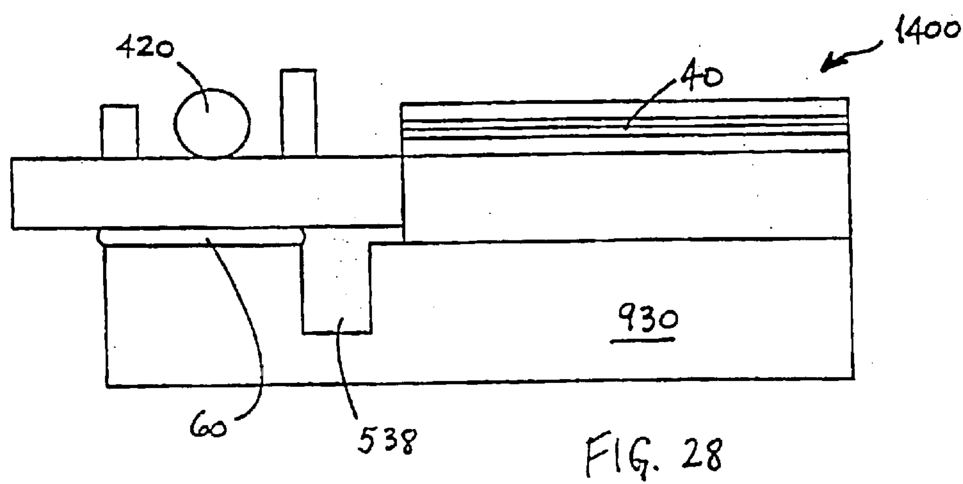
FIG. 28

520
28
522
521
1500
521
40
28
522
90
60
1030
1036

1600
320
40
28
190
60
1036
191

OPTICAL ASSEMBLY FOR COUPLING WITH INTEGRATED OPTICAL DEVICES AND METHOD FOR MAKING

CROSS-REFERENCE TO RELATED APPLICATIONS

This application claims priority from provisional application Ser. No. 60/249,795, filed Nov. 16, 2000, the entire disclosure of which is incorporated herein by reference.

BACKGROUND

Conventional glass lenses bend light only at its surfaces. At the interface between air and glass, rays of light change direction according to an abrupt change in the index of refraction. By carefully controlling the shape and smoothness of the lens surfaces, these rays can be brought to a focus and form an image. Alternatively, GRIN (GRadient INdex) lenses gradually vary the index of refraction within the lens material and light rays are smoothly and continually redirected towards a point of focus. The internal structure of this index "gradient" dramatically reduces the need for tightly-controlled surface curvatures and results in a simple, compact lens geometry.

GRIN lenses are sometimes utilized for efficient optical coupling to integrated optical devices, especially for coupling between optical fibers and integrated optical waveguides having a high delta n. The alignment of an optical fiber with a GRIN lens and an integrated optical device is complicated because three independent devices must be fixed at a point in space in such a way to provide optimal alignment.

SUMMARY

The invention provides an optical assembly that includes a substrate with an upper surface and a cut-out portion, an optical array mounted on the upper surface, and an imaging assembly positioned at least partially within the cut-out portion. The imaging assembly includes at least one imaging device mounted on a first chip. The optical array is optically coupled to the imaging assembly.

The invention further provides an optical assembly having a notch which serves as a wick stop. The optical assembly includes a substrate with an upper surface, an optical array mounted on the upper surface, an integrated optic chip mounted on the upper surface, and a waveguide mounted on the integrated optic chip. The waveguide includes at least one waveguide core encased within a cladding. The optical array is optically coupled to the integrated optic chip through the waveguide.

The invention further provides a method for assembling an optical assembly that includes a substrate having an upper surface and a cut-out portion, an optical array, and an imaging assembly. The method includes the steps of positioning the optical array on the substrate upper surface, lowering the imaging assembly at least partially within the cut-out portion, optically coupling the optical array with the imaging assembly, and affixing the imaging assembly to the substrate and the optical array to the imaging assembly.

These and other advantages and features of the invention will be more readily understood from the following detailed description of the invention which is provided in connection with the accompanying drawings.

BRIEF DESCRIPTION OF THE DRAWINGS

FIG. 3 is another perspective view like FIG. 2.

FIG. 4 is another side view showing the optical assembly of FIG. 1 in an assembled state.

FIG. 17 is a side view of an optical assembly constructed in accordance with another embodiment of the invention.

FIG. 18 is a front view of the optical assembly of FIG. 17.

FIG. 23 is a perspective view of an optical assembly constructed in accordance with another embodiment of the invention.

FIG. 24 is a side view of the portion of the optical assembly of FIG. 23.

FIG. 26 is a side view of the portion of the optical assembly of FIG. 25.

FIG. 27 is a side view of an optical assembly constructed in accordance with another embodiment of the invention.

FIG. 28 is a side view of an optical assembly constructed in accordance with another embodiment of the invention.

DETAILED DESCRIPTION OF PREFERRED EMBODIMENTS

Figure 1:
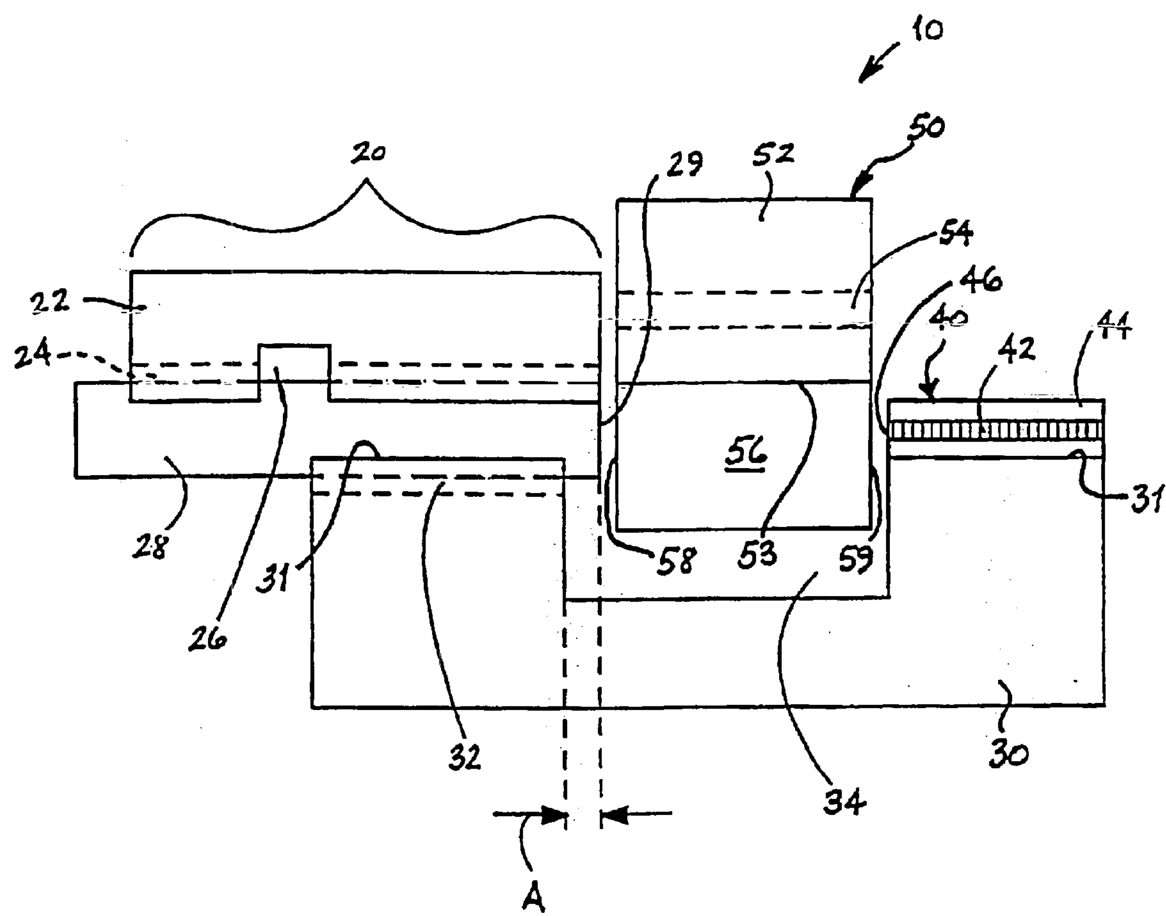
FIG. 1 is a side view showing the assembly of an optical assembly in accordance with an embodiment of the invention.

Referring now to FIGS. 1–4, there is shown an optical assembly 10 which includes an optical fiber array 20, a substrate 30, an optical waveguide 40, and an imaging assembly 50. The optical fiber array 20, the optical waveguide 40, and the imaging assembly 50 are aligned to allow light to traverse along a path including an optical fiber, a GRIN lens, and a waveguide core (FIG. 4), as will be described in detail below.

The optical fiber array 20 includes a fiber chip 22 with a plurality of V-grooves 24 on a surface thereof and a notch 26 aligned transverse to the V-grooves 24. The V-grooves are sized and configured to each receive an optical fiber 28, which may be held in place within the V-groove 24 with an adhesive material, such as a glue or an epoxy. Each optical fiber 28 has an end 29. The notch 26 serves as a wick stop for the adhesive material. The optical fiber array 20 may, instead, be replaced with another optical array, such as an optical bench.

Figure 2:
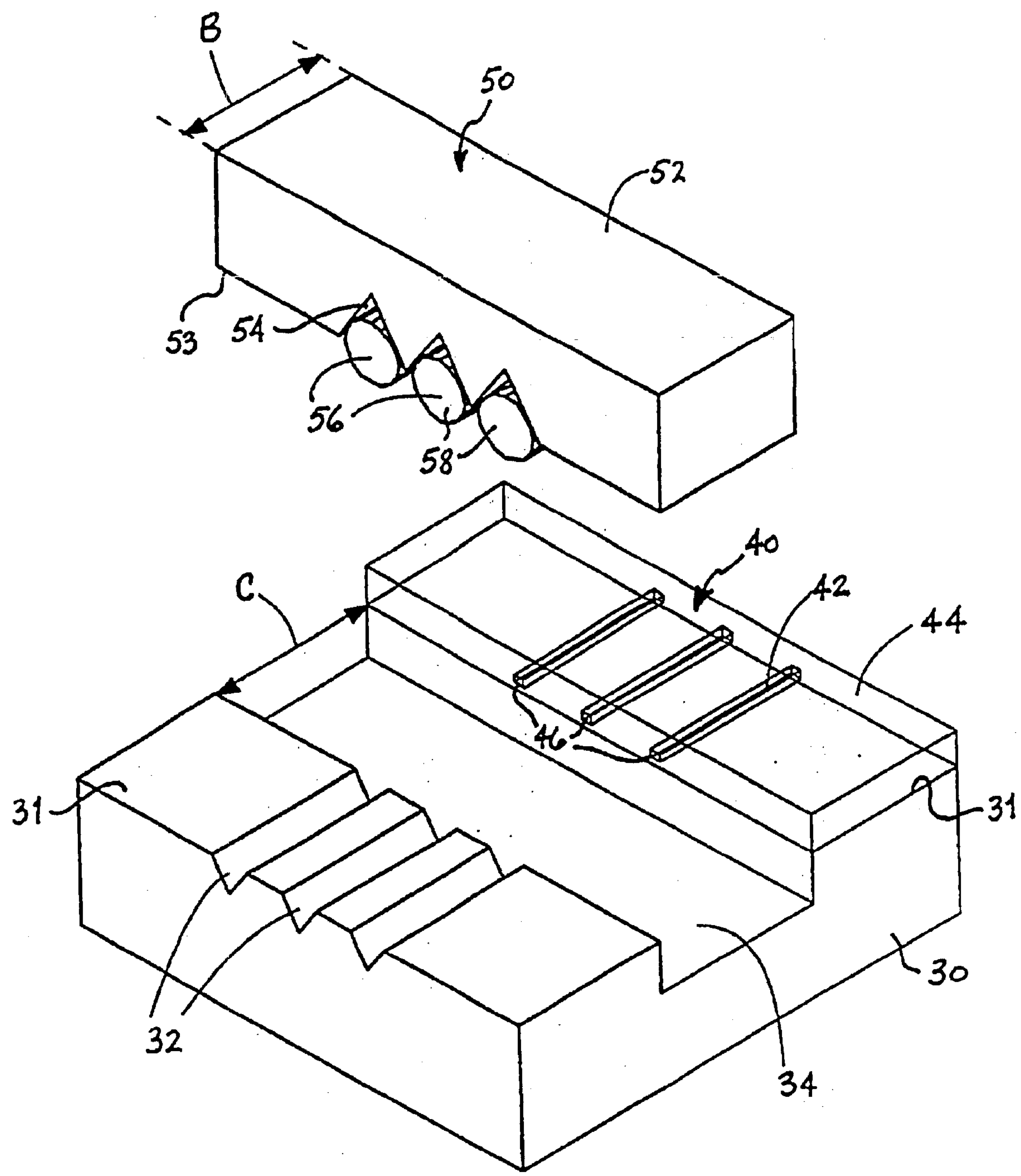
FIG. 2 is a perspective view of a portion of the optical assembly of FIG. 1.

The substrate 30 includes an upper surface 31 in which a plurality of V-grooves 32 are located. The V-grooves 32 are located to receive the optical fibers 28. The substrate 30 further includes a valley 34, which is a cut-out portion in the substrate which preferably is formed with a dicing saw or other similar device. The valley 34 has a width C (FIG. 2). The optical fiber 28 is positioned such that a portion A of the fiber 28 extends into the valley 34. The portion A should have a length which is less than about five times the diameter of the optical fiber 28. Preferably, the portion A should be less than about 600 microns in length. The imaging assembly 50 fits within the valley 34. The waveguide 40 is located on the upper surface 31 opposite from where the optical fiber array 20 is positioned.

The waveguide 40 includes a plurality of waveguide cores 42 encased within a cladding 44. Each of the waveguide cores 42 has an end 46. The imaging assembly 50 includes a lens chip 52 with a lower surface 53, into which is positioned a plurality of V-grooves 54. A GRIN lens 56 is located within each V-groove 54. The GRIN lenses 56 each have a first end 58 and a second end 59. The imaging assembly 50 has a width B which is less than the width C of the valley 34. Preferably, the width B is between about 25 and about 500 microns less than the width C of the valley 34.

To assemble the optical assembly 10, the optical fiber array 20 is positioned in, but not adhered to, the V-grooves 32 of the substrate such that the portion A extends into the valley 34. The imaging assembly 50 is then disposed into the valley 34. The optical fiber array 20 is then moved to place the ends 29 of the optical fibers 28 flush with the first ends 58 of the GRIN lenses 56 and to place the second ends 59 of the GRIN lenses 56 flush with the ends 46 of the waveguide cores 42. Then, the imaging assembly 50 is moved in the direction D to obtain optimal optical power through the optical assembly 10. It should be noted that in this position the imaging assembly 50 has two translational and one rotational degrees of freedom. The GRIN lenses 56 preferably do not contact the bottom surface of the valley 34. Upon achieving optimal optical power, an adhesive material 60 is placed in strategic locations to affix the optical fiber array 20 to the imaging assembly 50 and the imaging assembly 50 to the waveguide 40 and to the substrate 30. Through this methodology, passive alignment of the optical fiber array 20, the waveguide 40 and the imaging assembly 50 is obtained.

The optical assembly 10 illustrated in FIGS. 1–4 is adapted to be affixed to an integrated optic chip. A preferred method of affixing is bonding. Further, while the illustrated optical assembly 10 includes GRIN lenses 56, it should be appreciated that other types of imaging devices may be used. Specifically, the GRIN lenses 56 may be replaced with graded index fibers, or even short lengths of step-index fibers.

Figure 5:
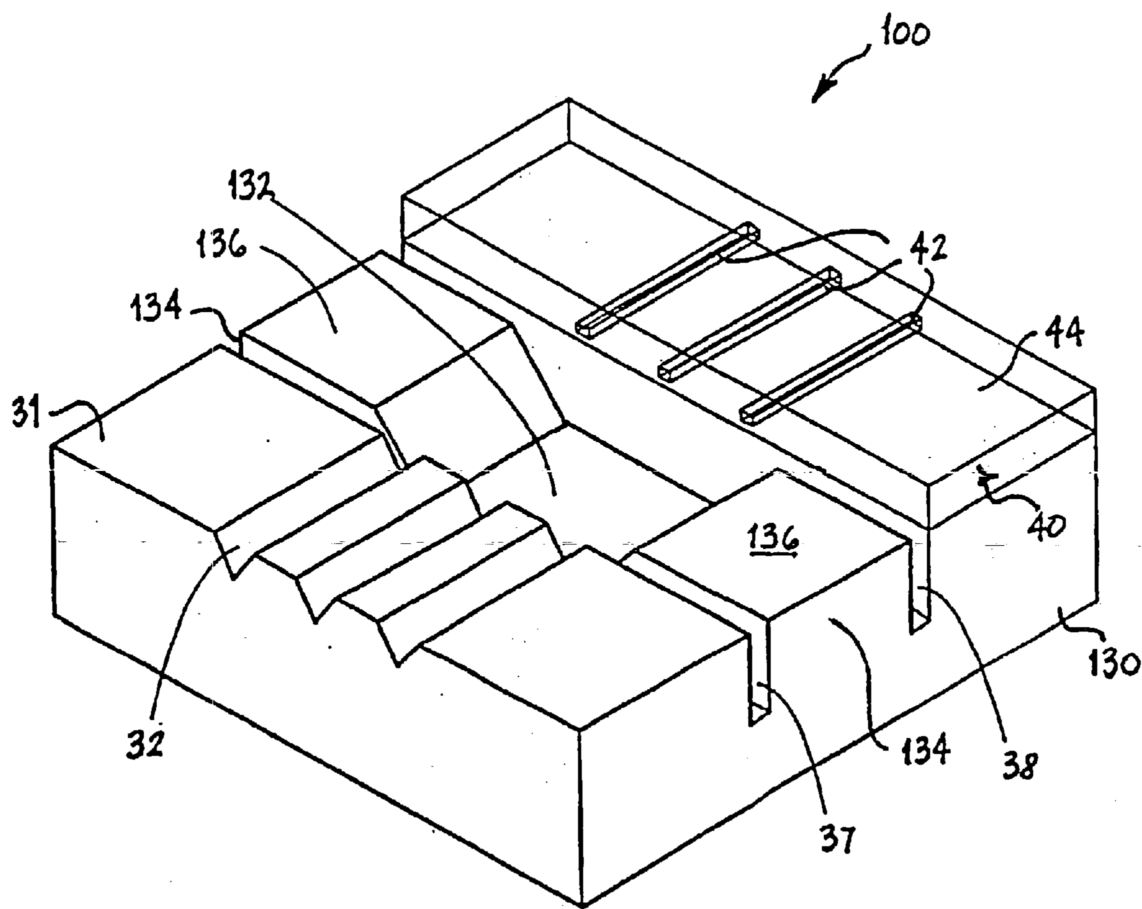
FIG. 5 is a perspective view of a portion of an optical assembly constructed in accordance with another embodiment of the invention.
Figure 6:
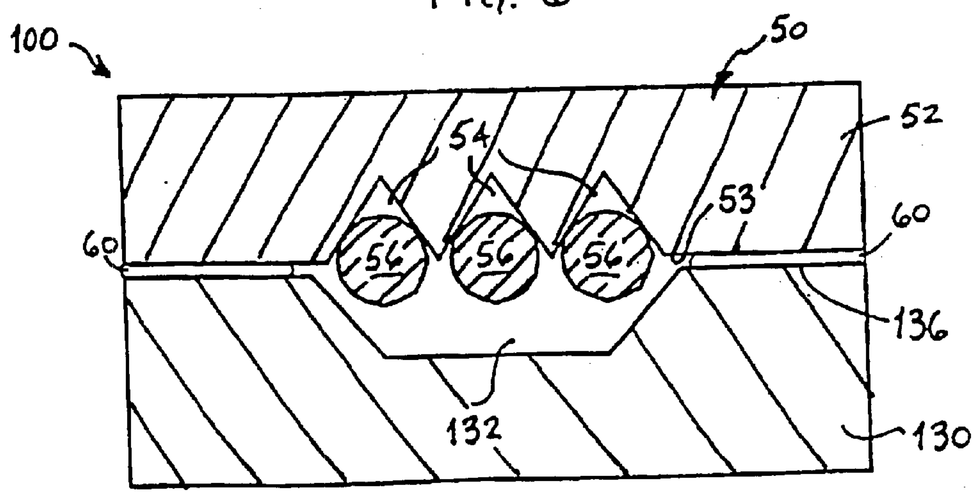
FIG. 6 is a cross-sectional view of the optical assembly of FIG. 5.

FIGS. 5–6 illustrate an alternative embodiment, showing a portion of an optical assembly 100 having a substrate 130. Instead of a valley 34 (FIGS. 1–4), the substrate 130 has a cut-out portion which takes the form of a recessed area 132 positioned between a pair of ledges 134. Each of the ledges 134 has an upper surface 136 which is in the same plane as the upper surface 31. On either side of the ledges 134 are positioned first and second notches 37, 38. The notches 37, 38 segregate various portions of the substrate 130. Preferably, the notches 37, 38 are formed through the use of a dicing saw.

As shown in FIG. 6, the surfaces 136 provide a surface to which the imaging assembly 50 can be affixed, through the use of the adhesive material 60. As noted, the GRIN lenses 56 do not contact any surfaces of the ledges 134 or the recessed area 132. The notches 37, 38 serve as wick stops to suppress flow of the adhesive material 60 used to adhere the imaging assembly 50 and the optical fiber array 20 to the substrate 30. The adhesive material 60 is inhibited from flowing into the notches 37, 38 due to surface tension. The notches 37, 38 may also serve to receive index matching materials which are useful between the fibers 56, the imaging assembly 50 and the waveguide assembly 40. Thus, since adhesive materials, such as the adhesive material 60, are inhibited from being in the light path from the optical fiber array 20 through the waveguide assembly 40, low cost adhesive materials, namely adhesive materials which are not optical quality, may be used. Further, since index matching materials may be used, such materials need not also have adhesive characteristics, and may instead be a non-adhesive gel.

Figure 7:
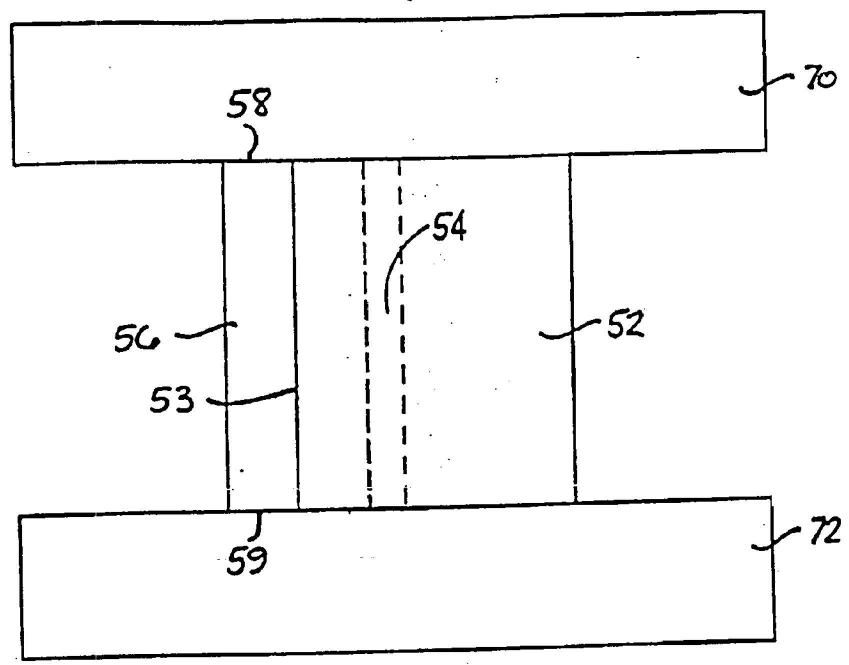
FIG. 7 is a top view of a lapping apparatus for smoothing the ends of an imaging assembly, such as the imaging assembly of FIGS. 1 and 6.

FIG. 7 illustrates a device which smoothes each side of the GRIN lenses 56. The smoothing, or lapping, device includes a top lapping plate 70 and a bottom lapping plate 72. The top lapping plate 70 smoothes the first end 58 of the GRIN lenses 56, while the bottom lapping plate 72 smoothes the second end 59 of the GRIN lenses 56.

Figure 8:
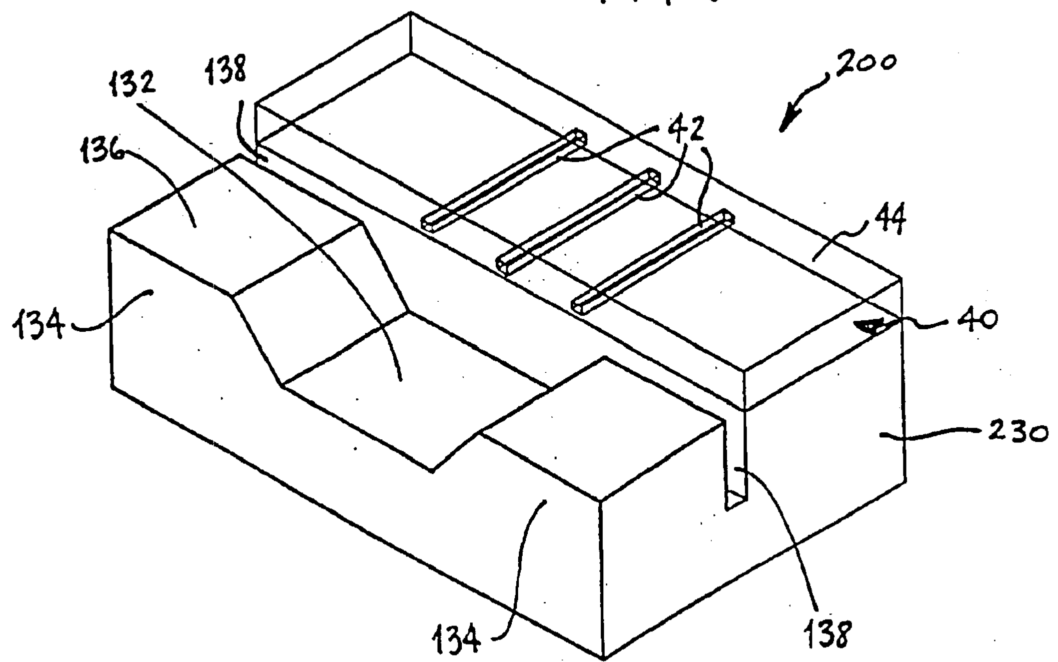
FIG. 8 is a perspective view of a portion of an optical assembly constructed in accordance with another embodiment of the invention.

FIG. 8 illustrates a portion of an optical assembly 200, which includes a substrate 230. The substrate 230 does not include the V-grooves 32 (FIGS. 1–4). Instead, the optical fiber array 20 is aligned with the imaging assembly 50 and the waveguide 40, and the imaging assembly 50 is affixed to the waveguide 40 and the surfaces 136. The optical fiber array 20 is then affixed to the imaging assembly 50, wholly unsupported by the substrate 230. Notches 138 may be cut into the substrate 230, separating the ledges 134 from the rest of the substrate 230. The notches 138 may extend a greater distance into the substrate 230 than the lower surface of the recessed area 132.

Figure 9:
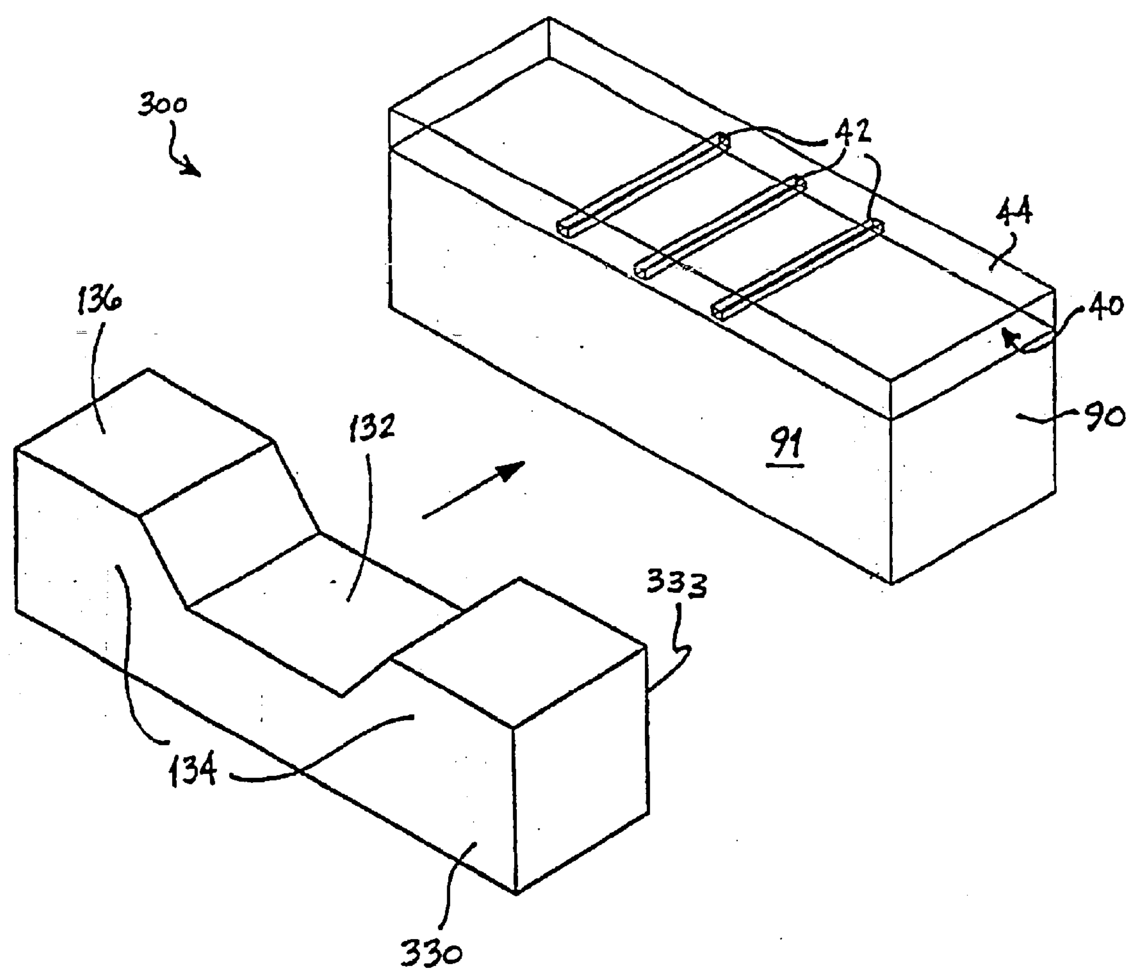
FIGS. 9–11 are perspective views showing the assembly of a portion of an optical assembly in accordance with another embodiment of the invention.
Figure 10:
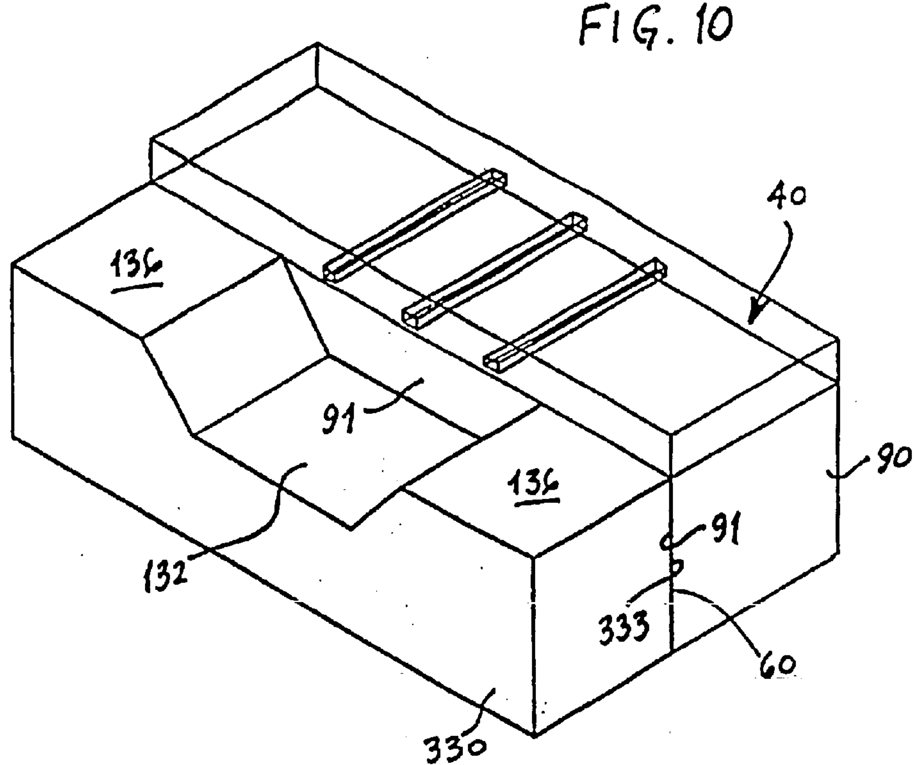
Figure 11:
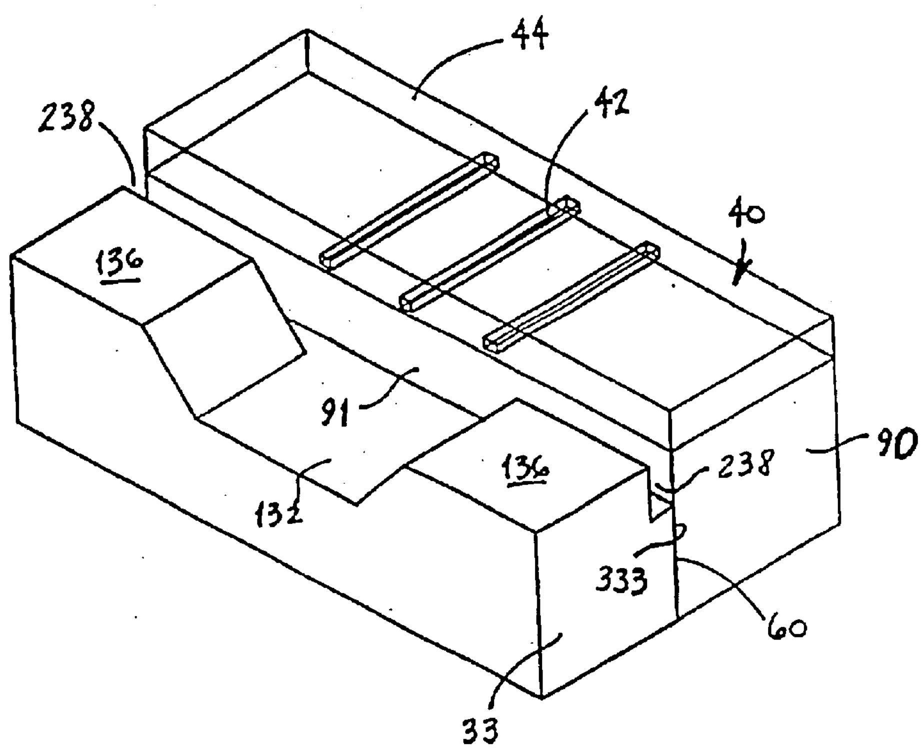

FIGS. 9–11 show a portion of another optical assembly 300 constructed in accordance with an embodiment of the invention. The optical assembly 300 includes a substrate 330, which includes the recessed area 132 between the ledges 134, and an integrated optic chip 90, which serves as a stable base for the waveguide 40. The substrate 330 and the integrated optic chip 90 are moved together such that a side surface 333 of the substrate 330 is contacted with a surface 91 of the integrated optic chip 90. An adhesive material 60 is utilized to affix the substrate 330 and the integrated optic chip 90 together. Then, notches 238 may be diced into the substrate 330. It is not necessary for the integrated optic chip 90 to be aligned accurately with the substrate 330. Further, the substrate 330 provides no passive alignment capability for either the optical fiber array 20 or the imaging assembly 50. Further, the imaging assembly 50 may be omitted in this illustrated embodiment, with the optical fibers 28 being coupled directly to the waveguide cores 42.

An advantage of the substrate 330 is that it may suppress the flow of the adhesive material 60 between the optical fibers 28 and the waveguide cores 42, preventing the adhesive material 60 from interfering with the optical path. The notches 238 serve as a wick stop trench, further suppressing flow of the adhesive material. Another advantage of utilizing the substrate 330 is that it allows surface 91 of the integrated optic chip 90 to be polished.

Figure 12:
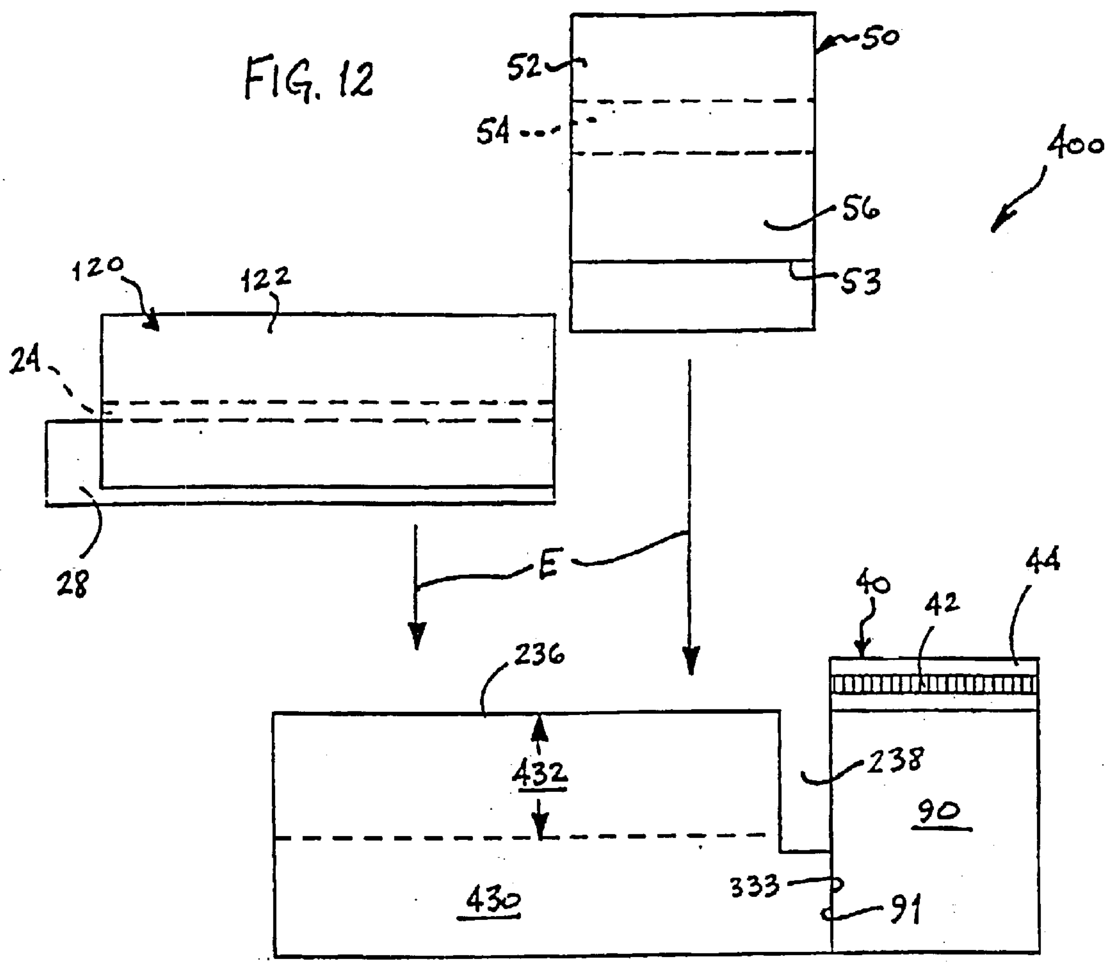
FIGS. 12–13 are side views showing the assembly of an optical assembly constructed in accordance with another embodiment of the invention.
Figure 13:
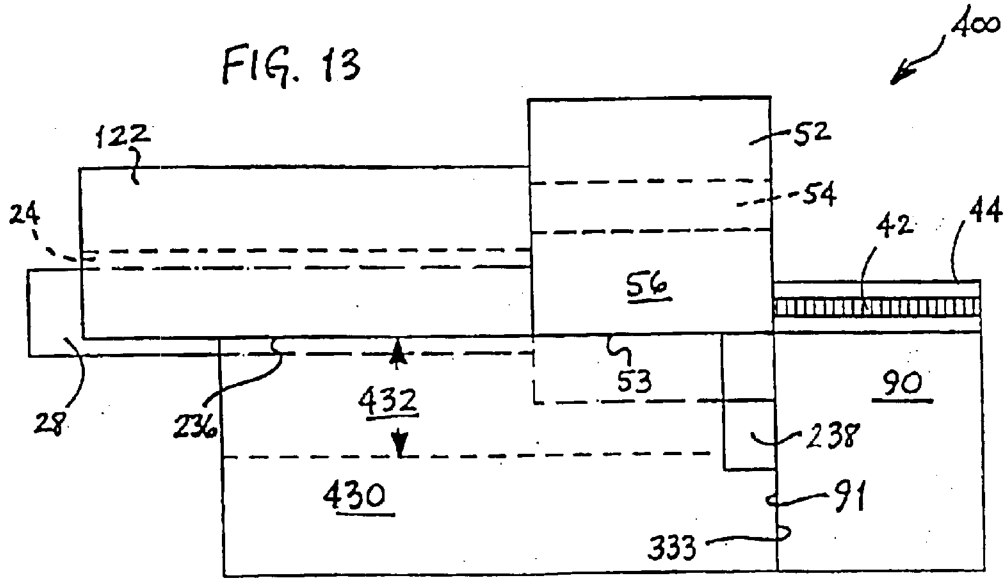
Figure 14:
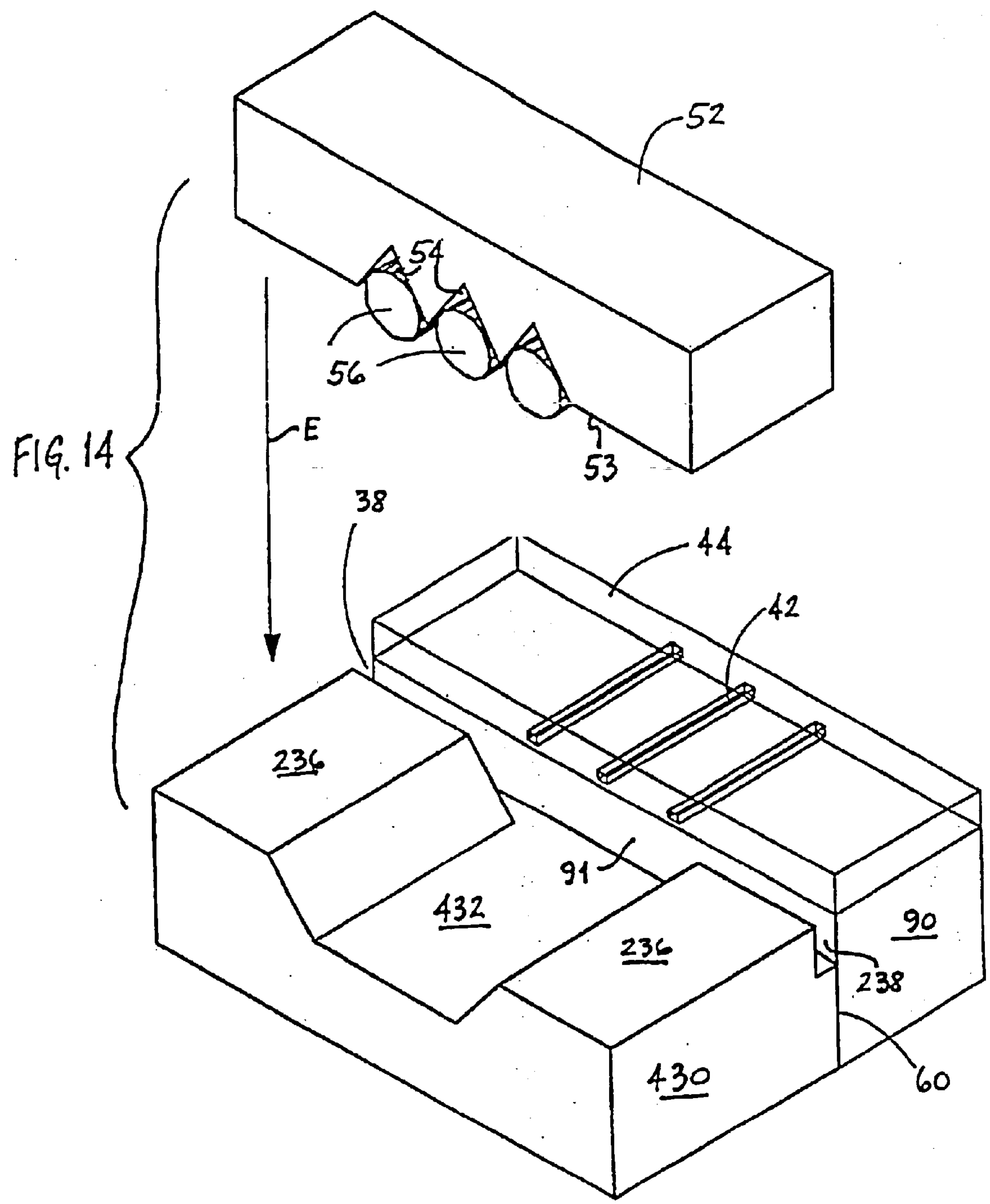
FIG. 14 is a perspective view showing the assembly of a portion of the optical assembly of FIGS. 12–13.

FIGS. 12–14 illustrate the assembly of another optical assembly 400, which includes an optical fiber array 120, the waveguide 40, the imaging assembly 50, and a substrate 430. The optical fiber array 120 differs from the optical fiber array 20 in that it lacks the notch 26. The substrate 430 has a greater width than the substrate 330, and thereby allows the mounting of both the optical fiber array 120 and the imaging assembly 50 to an upper surface 236 thereof. The substrate 430 has a recessed area 432 between the surfaces 236. Further, at one end is a notch 238. The substrate 430 is affixed to the integrated optic chip 90 such that the surface 333 of the substrate 430 is adhered to the surface 91 of the integrated optic chip 90. The optic fiber array 120 is positioned such that the fiber chip 122 contacts the upper surface 236, allowing a portion of the fibers 28 to extend into the recessed area 432. The imaging assembly 50 also extends into the recessed area 432. It should be appreciated that the recessed area 432 may be shallower or deeper than the notch 338.

A preferred method for assembling the optical assembly 400 is to bond the substrate 430 to the integrated optic chip 90. Again, the alignment need not be accurate between the substrate 430 and the integrated optic chip 90. Then, the optic fiber array 120 is positioned against the surfaces 236, but is preferably not bonded at this time. The imaging assembly 50 is then inserted between the fibers 28 and the waveguide cores 42 and the position of the imaging assembly 50 is adjusted until a good coupling is obtained. The imaging assembly 50 and the optical fiber array 120 are then bonded to the surfaces 236.

The substrate 430, as with the other illustrated substrate embodiments, may be formed of silicon, glass, quartz or pyrex. If, for example, an ultraviolet light transparent glass is used to form the substrate 430, then an ultraviolet light-curable adhesive may be cured by exposing it through the substrate 430.

Figure 15:
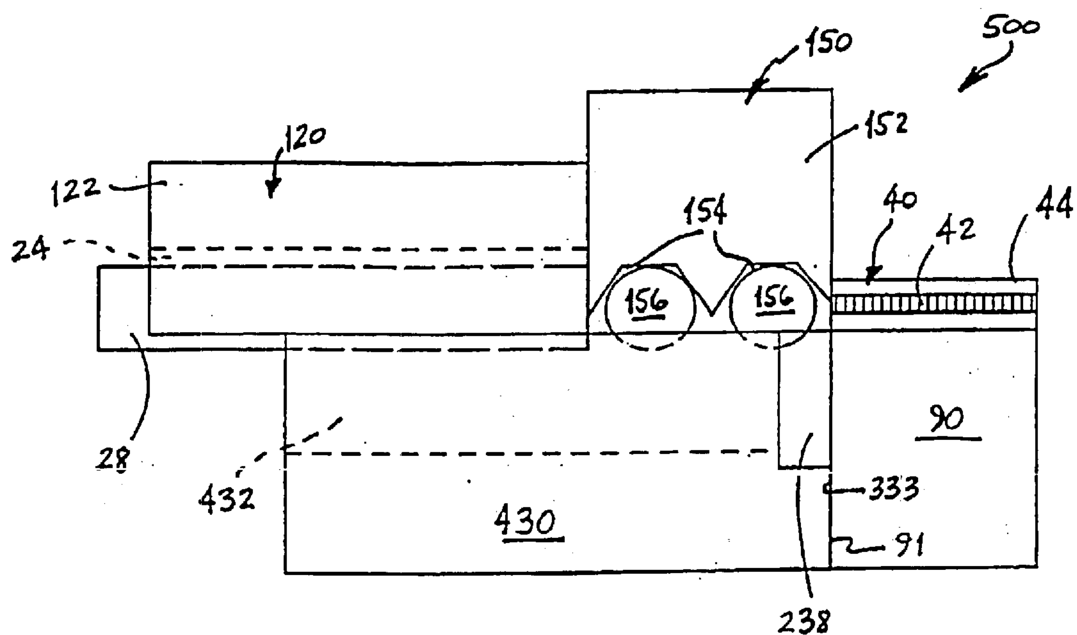
FIG. 15 is a side view of an optical assembly constructed in accordance with another embodiment of the invention.

FIG. 15 illustrates another optical assembly 500 including the substrate 430, the integrated optic chip 90, the optical fiber array 120, the waveguide 40, and a imaging assembly 150. The imaging assembly 150 includes a lens chip 152 having cut-out portions 154 on a lower surface thereof. Ball lenses 156 are placed within the cut-out portions 154 for accurate alignment of the imaging assembly 150 with the waveguide 40 and the optical fiber array 120. The cut-out portions may be anisotropically etched. Preferably, the optical fiber array 120 is passively aligned by contact with the surfaces 236, while the imaging assembly 150 is preferably actively aligned. It should be appreciated that instead of ball lenses 156, the chip 152 may hold other optical devices, such as, for example, filters, isolators, modulators, lasers, and the like. It should be further understood that the imaging assembly 150 may be utilized with other substrates described herein.

Figure 16:
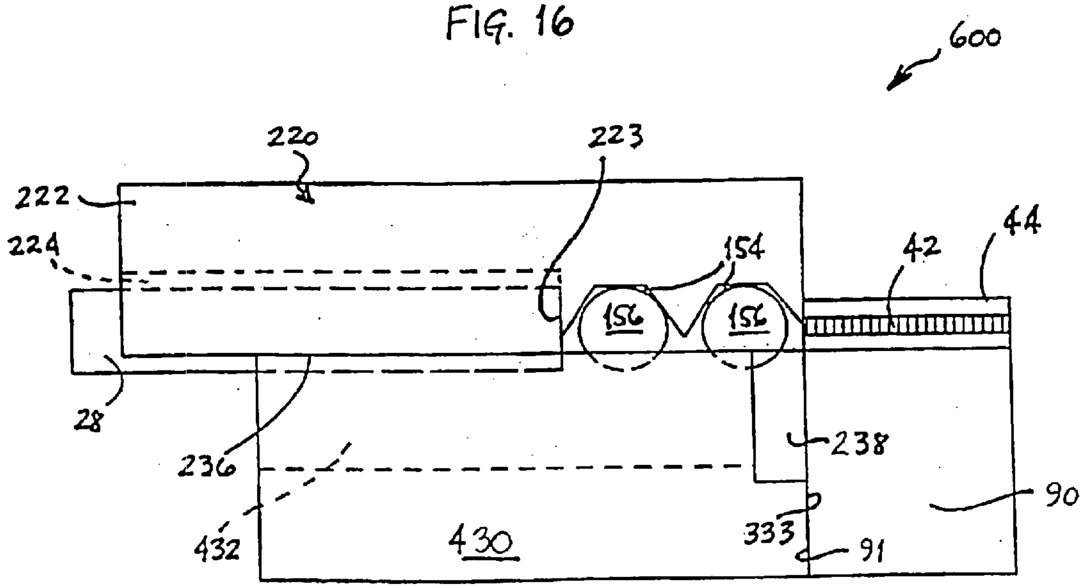
FIG. 16 is a side view of an optical assembly constructed in accordance with another embodiment of the invention.

An optical assembly 600 is illustrated in FIG. 16. The optical assembly 600 includes the substrate 430, the integrated optic chip 90, and the waveguide 40, and it further includes a combined optical fiber and imaging assembly 220. The assembly 220 includes a chip 222, which has a V-groove 224, and the cut-out portions 154 for the ball lenses 156. The optical fibers 28 are located within the V-grooves 224 such that an end of the fibers 28 abuts a ledge surface 223 of the chip 222. The assembly 220 is preferably actively aligned with the waveguide cores 42 and then bonded to the surfaces 236. It should be appreciated that GRIN lenses 56 may be utilized in the optical assembly 600 instead of the ball lenses 156.

FIGS. 17–18 illustrate an optical assembly 700 which does not include a imaging assembly. Instead, the optical fibers 28 are coupled directly to the waveguide cores 42. The optical fiber array 320 is mounted on a substrate 530, having a recessed area 532 between surfaces 536. The substrate 530 is affixed to the integrated optic chip 90, as described above. It should be appreciated that the optical fiber array 320 need not be in direct contact with the substrate 530, since a small gap of about two to about twenty microns would provide space for the adhesive material 60. Since a variable gap is acceptable, the optical fiber array 320 may be actively aligned with the waveguide cores 42.

The optical fiber array 320 includes a chip 322 and a lid chip 80. The lid chip 80 includes a plurality of V-grooves 82. The recessed area 532 is required to be deep enough to allow room for the lid chip 80.

Figure 19:
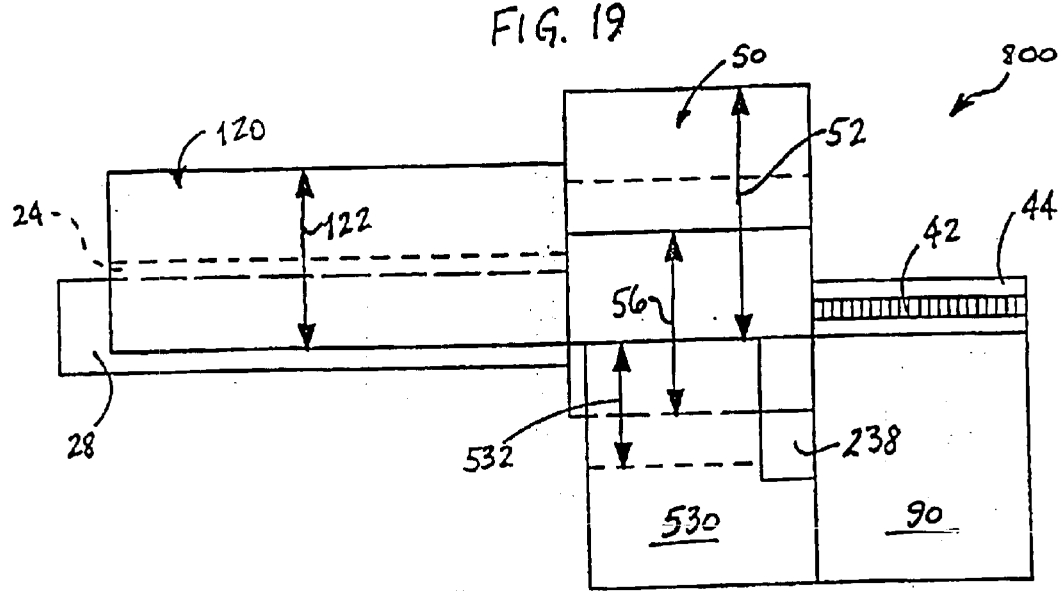
FIG. 19 is a side view of an optical assembly constructed in accordance with another embodiment of the invention.

Alternatively, as shown on FIG. 19, an optical assembly 800 is illustrated which includes the imaging assembly 50. The imaging assembly 50 is disposed on the substrate 530. In this embodiment, the optical fiber array 120 is butt-coupled to the imaging assembly 50. Instead of the imaging assembly 50, the imaging assembly 150 (FIG. 15) may be inserted into the recessed area 532.

Figure 20:
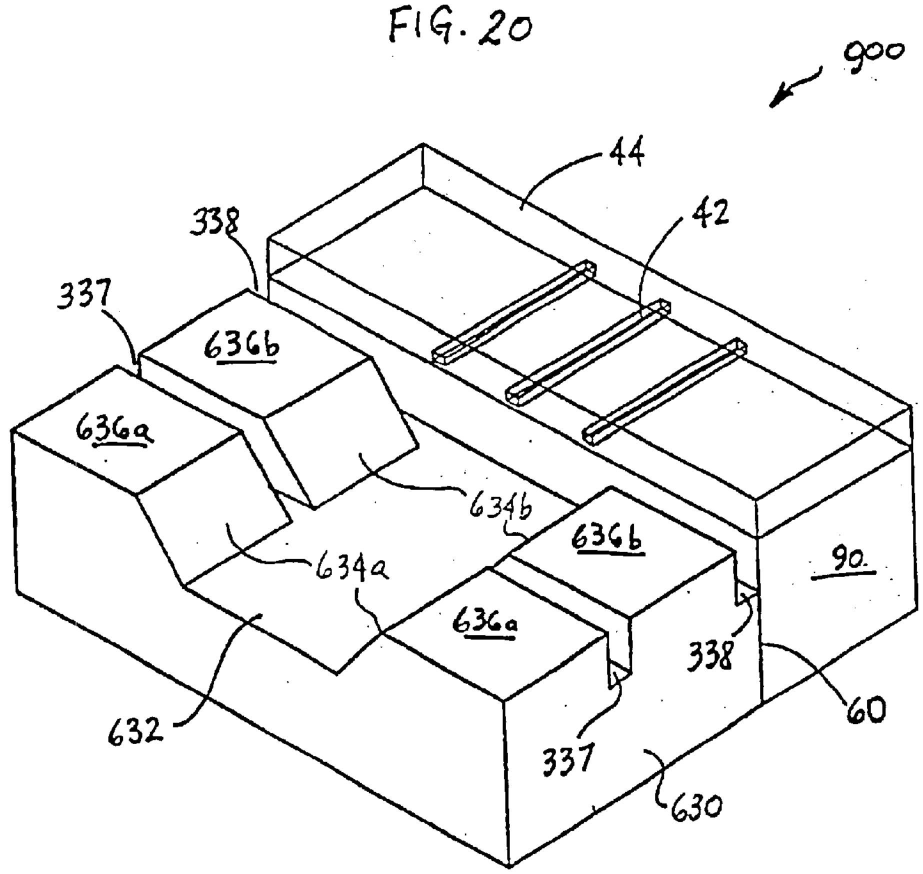
FIG. 20 is a perspective view of a portion of an optical assembly constructed in accordance with another embodiment of the invention.
Figure 21:
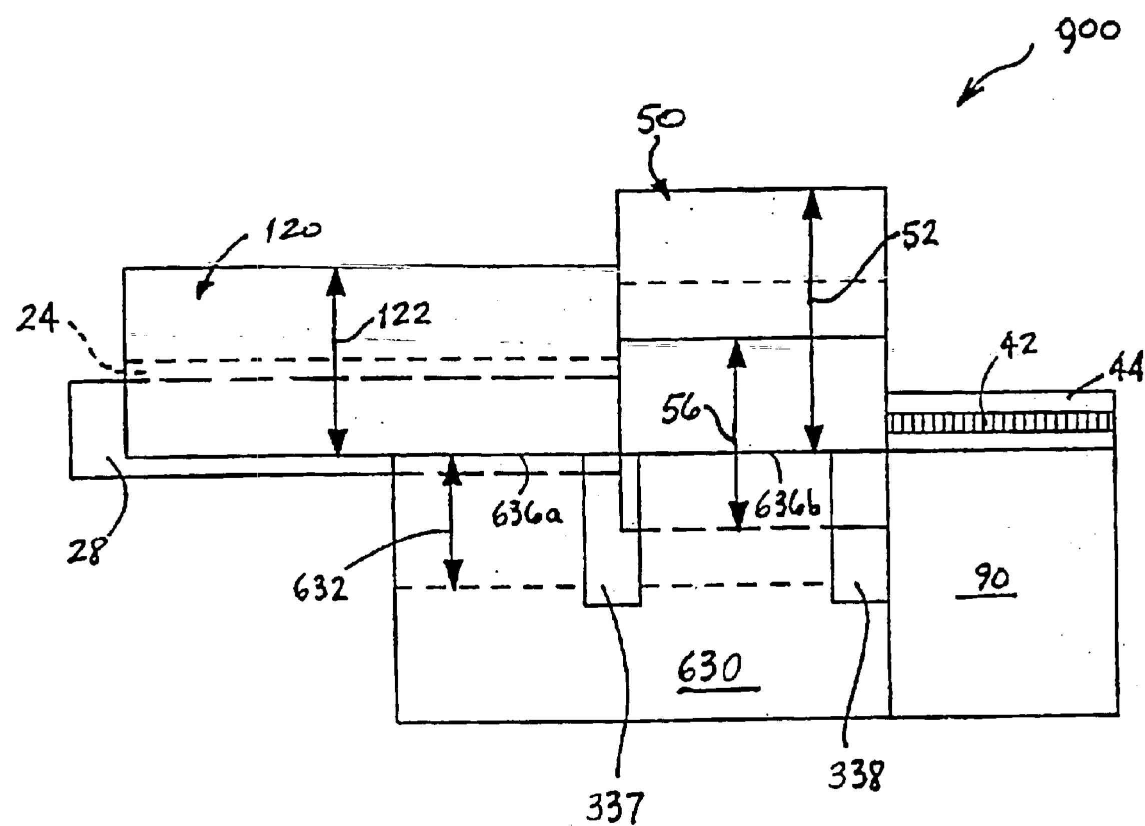
FIG. 21 is a side view of an assembled optical assembly including the portion of the optical assembly of FIG. 20.

FIGS. 20–21 illustrate a portion of an optical assembly 900, which includes a substrate 630 affixed to the integrated optic chip 90. The substrate 630 has a recessed area 632 which is between a first pair of ledges **634*a* and a second pair of ledges 634*b*. Each ledge 634*a* has a surface 636*a*, and each ledge 634*b* has a surface 636*b*. The surfaces 636*a* and 636*b* are all in the same plane. The ledges 634*a* are separated from the ledges 634*b* by notches 337. Notches 338 are located between the ledges 634*b* and the integrated optic chip 90. The notches 337 and 338 each serve as wick stops to allow the optical fiber array 120 to be bonded separately from the imaging assembly 50. The imaging assembly 50** may be replaced with other optical components, such as, for example, tapered waveguides which provide mode-matching. Through this design, two sets of surfaces are present for bonding to the optical fiber array and the imaging assembly or other optical package.

Figure 22:
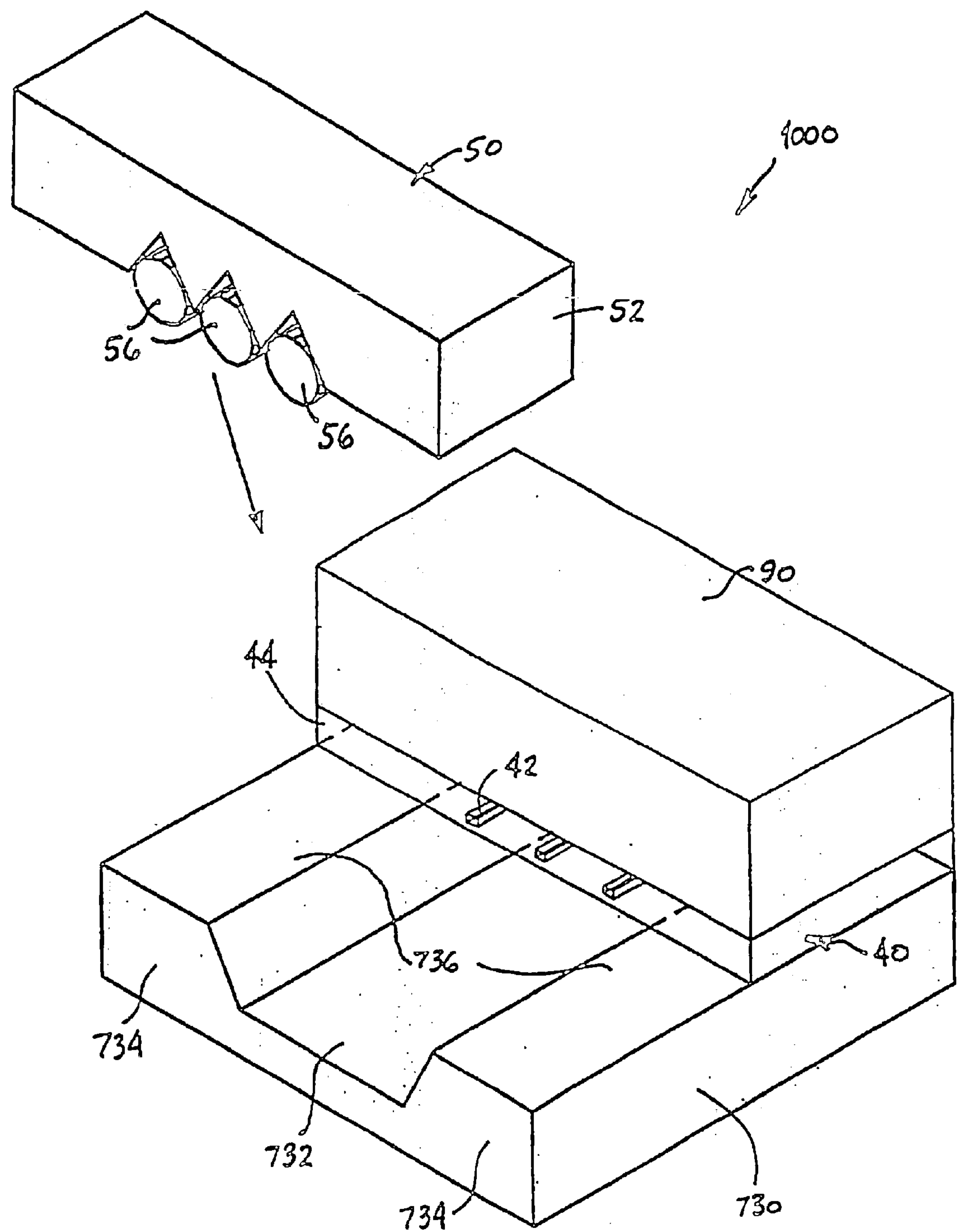
FIG. 22 is a perspective view showing the assembly of an optical assembly in accordance with another embodiment of the invention.

FIG. 22 illustrates a portion of an optical assembly 1000, which mounts the integrated optic chip 90, the optical fiber array, and the imaging assembly 50 on a substrate 730. The substrate 730 includes a recessed area 732 between ledges 734 which extend the length of the substrate 730. Each ledge has an upper surface 736 used for mounting the various arrays and assemblies. Specifically, the waveguide 40 is mounted on the surfaces 736, with the integrated optic chip 90 being mounted on the waveguide 40. Also, the imaging assembly 50 is mounted on the surfaces 736. It should be appreciated that the combined optical fiber and imaging assembly 220 may be utilized with the substrate 730.

FIGS. 23–24 illustrate another embodiment of the invention, showing a portion of an optical assembly 1100.

The optical assembly 110 includes a substrate 730, which differs from the substrate 630 with the inclusion of a transverse notch 438. As with the embodiment shown in FIG. 22, the optical fiber array and the imaging assembly are mounted on the surfaces 736 and over the recessed area 732. The groove 438 serves as a wick stop to suppress adhesive from flowing by capillary action between the waveguide 40 and the imaging assembly or whatever is coupled to the waveguide cores 42.

Figure 25:
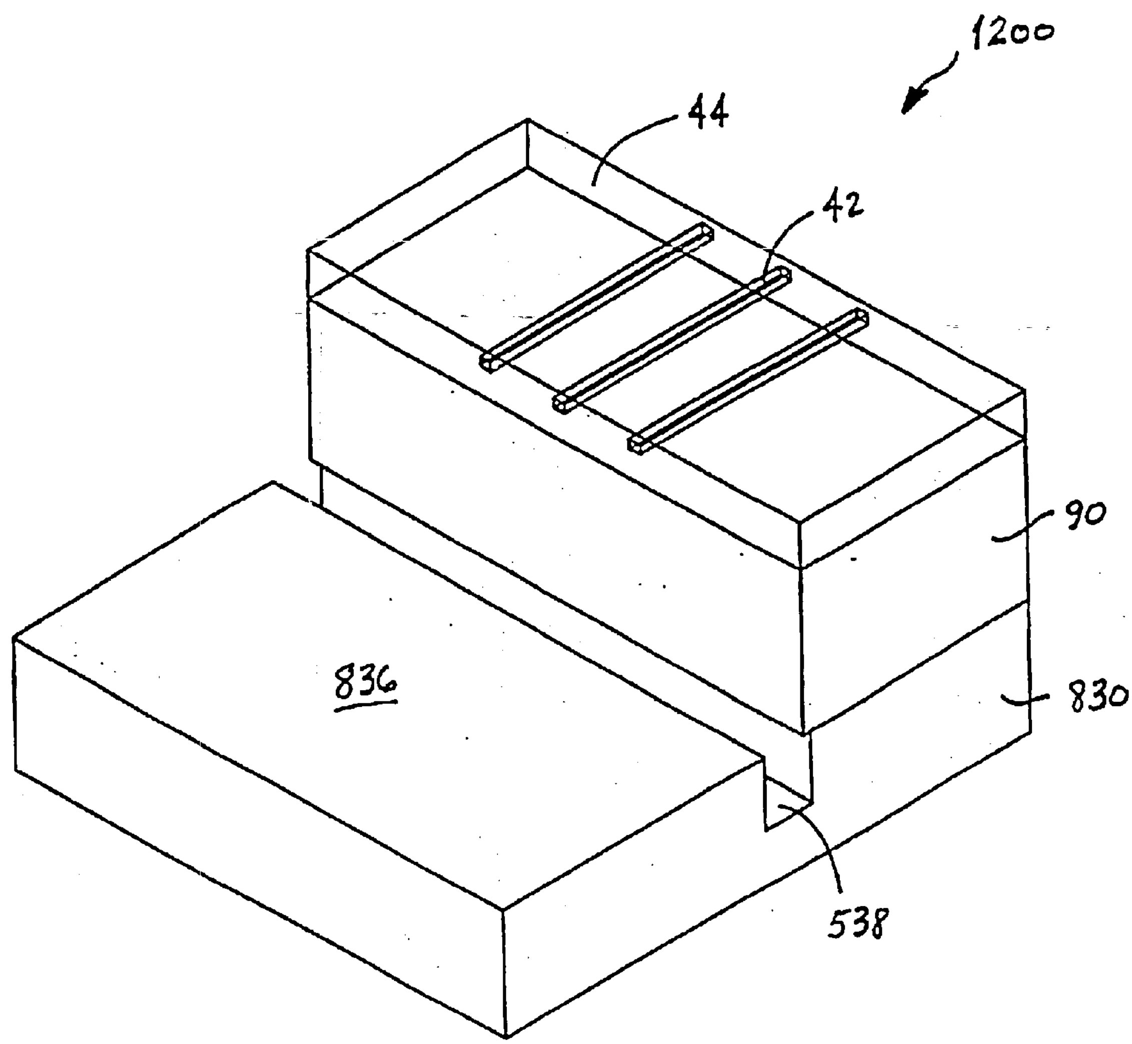
FIG. 25 is a perspective view of a portion of an optical assembly constructed in accordance with another embodiment of the invention.

FIGS. 25–26 illustrate a portion of an optical assembly 1200, which includes a substrate 830. The substrate 830 has a surface 836 and a transverse notch 538 bisecting the substrate 830 into two portions. The integrated optic chip 90 is mounted on one portion of the substrate 830, while the optical fiber array and the imaging assembly are mounted on the surface 836 on the other portion of the substrate 830. Note that the interface between the optical fiber array 320 and the integrated optic chip 90 is vertically over the notch 538 (FIG. 26). The optical fiber array 320 does not need to be passively aligned by contact with the substrate 830, but instead is actively aligned by the thickness of the fiber chip or chips. Other optical fiber arrays, such as the optical fiber arrays 20, 120, may be used instead. The thickness of the optical fiber array chip (or chips) and the integrated optic chip 90 are selected to allow for a small gap of about five to about 25 microns to exist between the surfaces 836 and the optical fiber array 320 to allow for the adhesive material 60 to be placed therein.

FIG. 27 illustrates another optical assembly 1300 embodiment. The optical assembly 1300 includes a substrate 930, which differs from the substrate 830 in the positioning of the notch 538. In the substrate 930, the notch 538 is positioned such that the optical fiber array 320 extends over the entire notch 538. Instead, other optical fiber arrays, such as the optical fiber arrays 20, 120, may be used.

An optical assembly 1400 is shown in FIG. 28. The optical assembly 1400 differs from other optical assemblies described herein in that an optical bench 420 is substituted for the optical fiber array.

Figure 29:
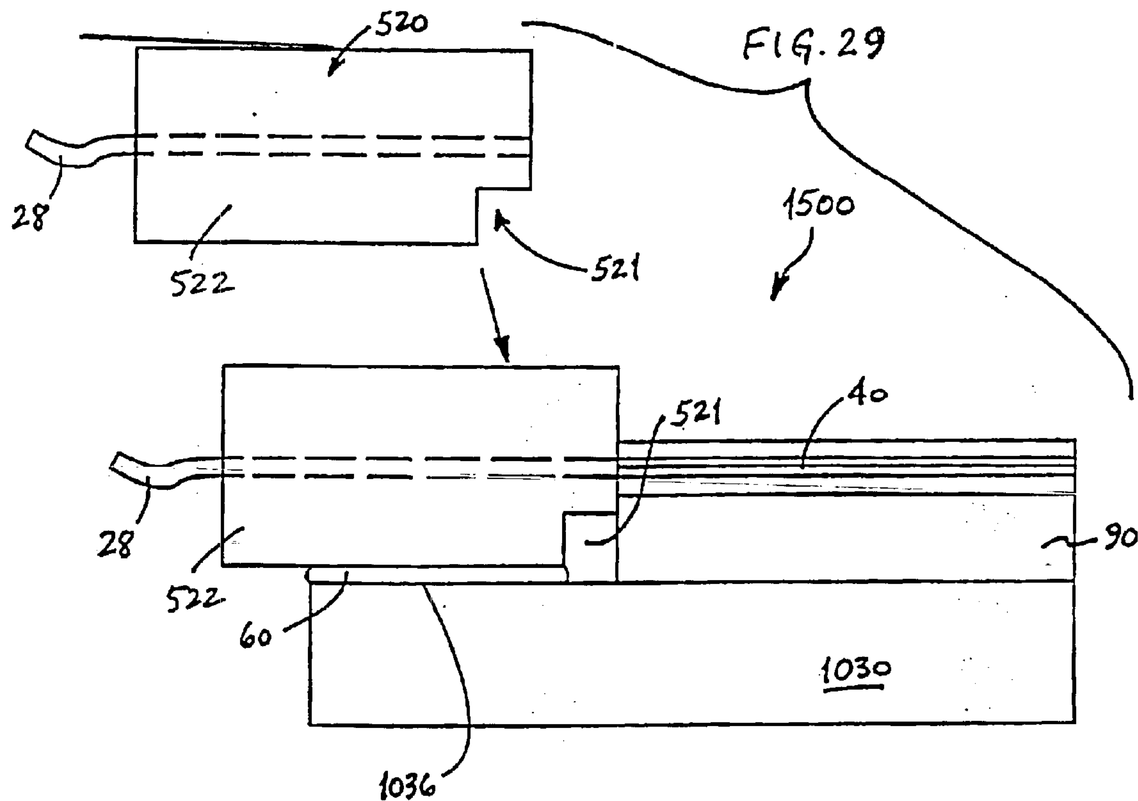
FIG. 29 is a side view showing the assembly of an optical assembly in accordance with another embodiment of the invention.

FIG. 29 shows an optical assembly 1500 being assembled. The optical assembly 1500 includes an optical fiber array 520, which includes a chip 522 having a notch 521 therein. The optical fiber array 520 and the integrated optic chip 90 are mounted on a substrate 1030 having an upper surface 1036. The notch 521 serves as a wick stop for suppressing adhesive from flowing between the optical fibers 28 and the waveguide cores 42.

Figure 30:
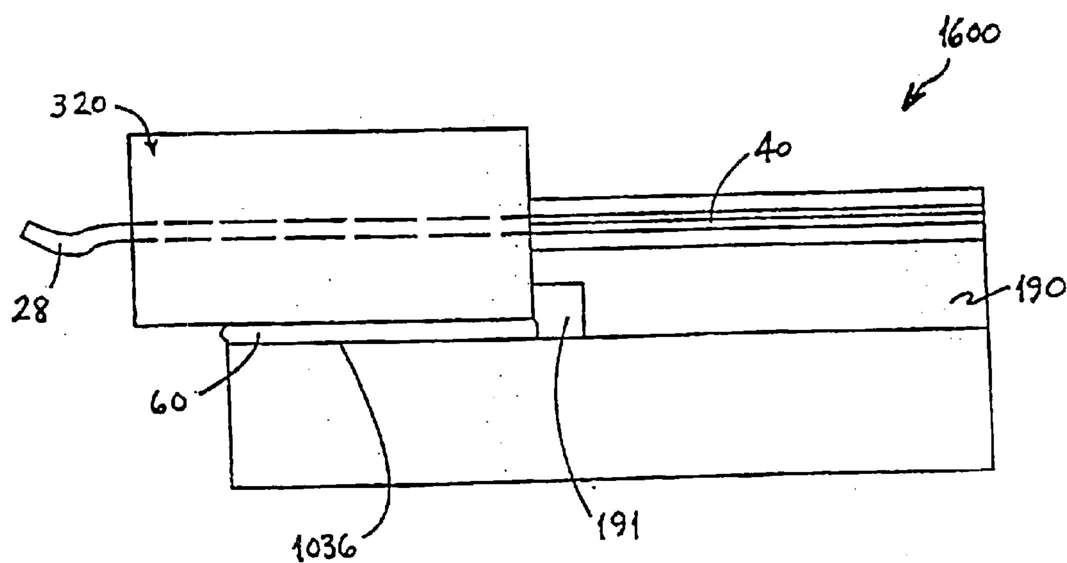
FIG. 30 is a side view of an optical assembly constructed in accordance with another embodiment of the invention.

Alternatively, as shown in FIG. 30, an optical assembly 1600 includes the optical fiber array 320 and an integrated optic chip 190 mounted on the substrate 1030. The integrated optic chip 190 includes a notch 191 which serves the same function as the notch 521 (FIG. 29). Another optical fiber array, such as the optical fiber arrays 20, 120, 420, instead may be used instead.

Figure 31:
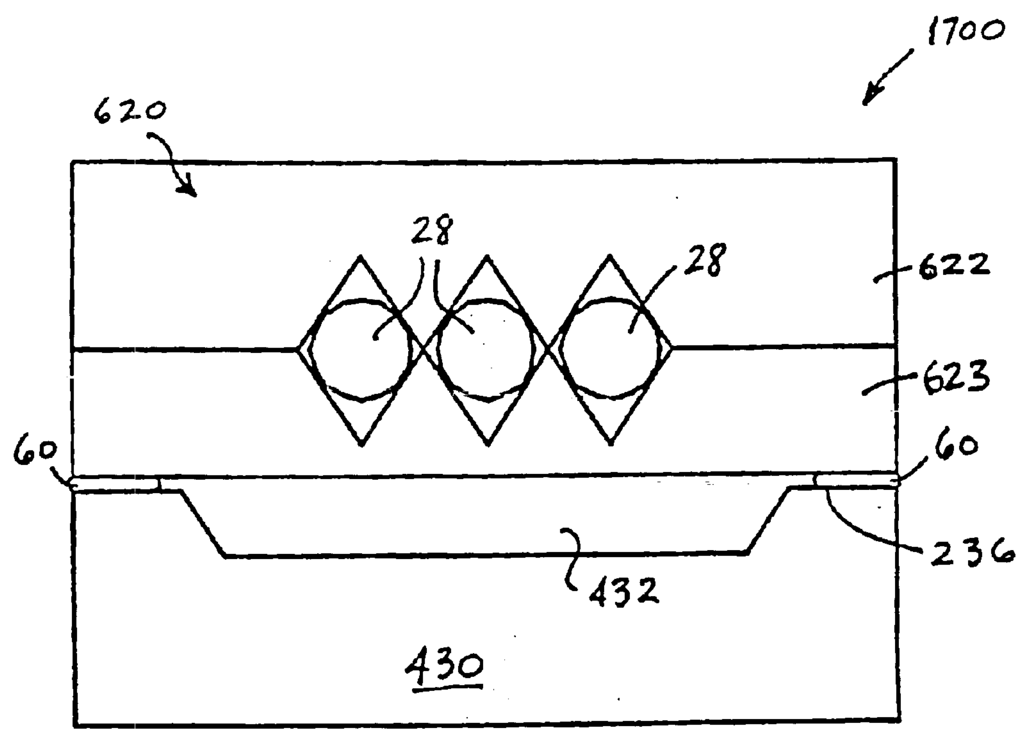
FIG. 31 is a front view of an optical assembly constructed in accordance with another embodiment of the invention.

FIG. 31 illustrates an optical assembly 1700 which includes an optical fiber array 620 which is mounted on the substrate 430 completely above the recessed area 432. The optical fiber array 620 includes a fiber chip 622 and a lid chip 623, both of which enclose the optical fibers 28 within V-grooves. The lid chip 623 is positioned on the surfaces 236 of the substrate 430 and adhered thereto. Obviously, any number of alternative substrates may be substituted for the substrate 430.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, although V-grooves are described and illustrated, it should be appreciated that other shapes of grooves may be utilized. Further, it should be appreciated that the notches shown and described may, instead of being cut with a dicing saw, be formed through isotropic or anisotropic etching. Accordingly, the invention is not to be seen as limited by the foregoing description, but is only limited by the scope of the appended claims.

What is claimed as new and desired to be protected by Letters Patent of the United States is:

1. An optical assembly, comprising:

a substrate comprising an upper surface and a cut-out portion;

an optical array mounted on said upper surface;

an imaging assembly positioned at least partially within said cut-out portion, said imaging assembly comprising at least one imaging device mounted on a first chip; and an integrated optic chip;

wherein said optical array is optically coupled to said imaging assembly and said integrated optic chip.

2. The optical assembly of claim 1, wherein said optical array is affixed to said imaging assembly and said imaging assembly is affixed to said substrate.

3. The optical assembly of claim 2, wherein the integrated optic chip comprises a waveguide comprising at least one waveguide core encased within a cladding.

4. The optical assembly of claim 3, wherein said integrated optic chip comprises a plurality of waveguide cores encased within a common cladding.

5. The optical assembly of claim 2, wherein said optical array comprises an optical bench.

6. The optical assembly of claim 2, wherein said optical array comprises an optical fiber array comprising a second chip and at least one optical fiber mounted to said second chip.

7. The optical assembly of claim 6, wherein a portion of said optical fiber extends over said cut-out portion.

8. The optical assembly of claim 6, wherein said second chip includes at least one V -groove, said optical fiber being mounted in said V -groove of said second chip.

9. The optical assembly of claim 8, wherein said second chip further includes a notch transverse to said V-groove.

10. The optical assembly of claim 6, wherein said optical fiber array comprises a lid chip.

11. The optical assembly of claim 1, wherein said first chip includes at least one V-groove, said imaging device being mounted in said V-groove of said first chip.

12. The optical assembly of claim 1, wherein said imaging device comprises a lens.

13. The optical assembly of claim 12, wherein said lens comprises a GRIN lens.

14. The optical assembly of claim 1, wherein said imaging device comprises a graded index fiber.

15. The optical assembly of claim 1, wherein said imaging device comprises a step-index fiber.

16. The optical assembly of claim 1, wherein said imaging device comprises a ball lens.

17. The optical assembly of claim 1, wherein said cut-out portion is a valley.

18. The optical assembly of claim 1, wherein said cut-out portion includes a recessed area between at least one pair of ledges.

19. The optical assembly of claim 18, wherein said substrate further includes at least one notch on a side of said ledges, said notch serving as a wick stop.

20. The optical assembly of claim 1, wherein said imaging device comprises a GRIN lens, a graded index fiber, a step-index fiber, or a ball lens.

21. The optical assembly of claim 1, wherein said optical array comprises a fiber chip or an optical bench.

22. The optical assembly of claim 1, wherein said substrate is a monolithic substrate.

23. An optical assembly, comprising:

a substrate comprising an upper surface, a cut-out portion and a side surface;

an optical array mounted on said upper surface;

an imaging assembly positioned at least partially within said cut-out portion, said imaging assembly comprising at least one imaging device mounted on a first chip, wherein said optical array is optically coupled to said imaging assembly; and an integrated optic chip affixed to said side surface of said substrate.

24. The optical assembly of claim 23, further comprising a waveguide mounted on said integrated optic chip, said waveguide being optically coupled with said imaging assembly and comprising at least one waveguide core encased within a cladding.

25. The optical assembly of claim 23, wherein said substrate further comprises at least one notch serving as a wick stop.

26. An optical assembly, comprising:

a notch which serves as a wick stop;

a substrate comprising an upper surface;

an optical array mounted on said upper surface;

adhesive positioned on said upper surface so as to affix said optical array to said upper surface without said adhesive entering said notch;

an integrated optic chip mounted on said upper surface; and a waveguide mounted on said integrated optic chip, said waveguide comprising at least one waveguide core encased within a cladding, wherein said optical array is optically coupled to said integrated optic chip through said waveguide.

27. The optical assembly of claim 26, wherein said notch is within said substrate.

28. The optical assembly of claim 27, wherein said optical array is mounted on said upper surface such that it at least partially covers said notch.

29. The optical assembly of claim 28, wherein said optical array completely covers said notch.

30. The optical assembly of claim 26, wherein said optical array comprises an optical fiber array which includes at least one optical fiber mounted on a fiber chip.

31. The optical assembly of claim 26, wherein said optical array comprises an optical bench.

32. An optical assembly, comprising:

a substrate comprising an upper surface;

an optical array mounted on said upper surface, said optical array comprising a notch which serves as a wick stop;

an integrated optic chip mounted on said upper surface; and a waveguide mounted on said integrated optic chip, said waveguide comprising at least one waveguide core encased within a cladding, wherein said optical array is optically coupled to said integrated optic chip through said waveguide.

33. The optical assembly of claim 32, wherein said optical array comprises an optical fiber array which includes at least one optical fiber mounted on a fiber chip, said notch being within said fiber chip.

34. The optical assembly of claim 32, wherein said integrated optic chip and said optical array are optically coupled at an interface which is vertically above said notch.

35. An optical assembly, comprising:

a substrate comprising an upper surface;

an optical array mounted on said upper surface;

an integrated optic chip mounted on said upper surface, said integrated optic chip comprising a notch which serves as a wick stop; and a waveguide mounted on said integrated optic chip, said waveguide comprising at least one waveguide core encased within a cladding, wherein said optical array is optically coupled to said integrated optic chip through said waveguide.

36. The optical assembly of claim 35, wherein said integrated optic chip and said optical array are optically coupled at an interface which is vertically above said notch.

37. A method for assembling an optical assembly which comprises a substrate having an upper surface and a cut-out portion, an optical array, an integrated optic chip, and an imaging assembly, said method comprising:

positioning said optical array on said substrate upper surface;

lowering said imaging assembly at least partially within said cut-out portion;

optically coupling said optical array with said imaging assembly;

optically coupling said integrated optic chip to said imagine assembly; and affixing said imaging assembly to said substrate and said optical array to said imaging assembly.

38. The method of claim 37, wherein said optical array comprises an optical fiber array with a plurality of optical fibers and wherein said upper surface includes a plurality of V-grooves, said positioning step comprising positioning each said optical fiber within one of said V-grooves.

39. The method of claim 37, wherein said imaging assembly comprises a plurality of lenses within a chip, said optically coupling step comprising moving said optical fibers such that an end of each said fiber comes into contact with an end of a respective said lens.

40. The method of claim 37, wherein said affixing step comprises adhering said imaging assembly to said substrate and adhering said optical array to said imaging assembly.

41. A method for assembling an optical assembly which comprises a substrate having an upper surface and a cut-out portion, an optical array, and an imaging assembly, said method comprising:

positioning said optical array on said substrate upper surface;

lowering said imaging assembly at least partially within said cut-out portion;

optically coupling said optical array with said imaging assembly; and affixing said imaging assembly to said substrate and said optical array to said imaging assembly, wherein said cut-out portion includes a recessed area between a pair of ledges, further comprising the step of creating a notch on at least one side of said ledges.

42. An optical assembly, comprising:

a substrate comprising an upper surface and a cut-out portion;

an optical array mounted on said upper surface;

an imaging assembly positioned at least partially within said cut-out portion, said imaging assembly comprising at least one imaging device mounted on a first chip; and an integrated optical device;

wherein said optical array is optically coupled to said imaging assembly and said integrated optical device.

43. An optical assembly, comprising:

a substrate comprising an upper surface and a cut-out portion;

an optical array mounted on said upper surface, said optical array comprising a plurality of optical fibers;

an imaging assembly positioned at least partially within said cut-out portion, said imaging assembly comprising at least one imaging device mounted on a first chip; and a plurality of waveguides that are not optical fibers;

wherein said optical fibers are optically coupled to said imaging assembly and said waveguides.

* * * * *